United States Patent
Inada

(10) Patent No.: US 8,907,878 B2
(45) Date of Patent: Dec. 9, 2014

(54) LIQUID CRYSTAL DISPLAY DEVICE AND METHOD FOR DISPLAYING FONTS ON LIQUID CRYSTAL DISPLAY DEVICE

(75) Inventor: Ken Inada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 195 days.

(21) Appl. No.: 13/640,352

(22) PCT Filed: Apr. 13, 2011

(86) PCT No.: PCT/JP2011/059204
§ 371 (c)(1),
(2), (4) Date: Oct. 10, 2012

(87) PCT Pub. No.: WO2011/129376
PCT Pub. Date: Oct. 20, 2011

(65) Prior Publication Data
US 2013/0027285 A1    Jan. 31, 2013

(30) Foreign Application Priority Data
Apr. 14, 2010    (JP) ................... 2010-093445

(51) Int. Cl.
G09G 3/36    (2006.01)
G09G 5/02    (2006.01)
G09G 5/28    (2006.01)

(52) U.S. Cl.
CPC ............. G09G 3/3607 (2013.01); G09G 5/026 (2013.01); *G02F 2201/52* (2013.01); *G09G 2300/0452* (2013.01); *G09G 2340/0457* (2013.01); *G09G 2340/06* (2013.01); *G09G 5/28* (2013.01)
USPC ............... 345/88; 345/89; 345/611; 345/613; 345/690; 345/694

(58) Field of Classification Search
USPC ................. 345/88–89, 611–616, 690–694
See application file for complete search history.

(56) References Cited

U.S. PATENT DOCUMENTS

| | | | |
|---|---|---|---|
| 2003/0210834 A1 | 11/2003 | Hitchcock et al. | |
| 2004/0234163 A1* | 11/2004 | Lee et al. | 382/298 |

(Continued)

FOREIGN PATENT DOCUMENTS

| | | |
|---|---|---|
| JP | 2004-004839 A | 1/2004 |
| JP | 2009-031384 A | 2/2009 |
| JP | 2009-192887 A | 8/2009 |
| JP | 2010-060907 A | 3/2010 |

OTHER PUBLICATIONS

Official Communication issued in corresponding European Patent Application No. 11768897.8, mailed on Oct. 30, 2013.

(Continued)

*Primary Examiner* — Lun-Yi Lao
*Assistant Examiner* — Elliott Deaderick
(74) *Attorney, Agent, or Firm* — Keating & Bennett, LLP

(57) ABSTRACT

A liquid crystal display device has pixels containing first to fourth subpixels ("SPs") having four different colors, respectively, arranged in a two-by-two matrix. In displaying a font on a pixel composed of three SPs having three different colors, respectively, arranged in three columns of stripes, the SP in the first column of stripes takes on a tone Tx, the SP in the second column of stripes takes on a tone Ty, and the SP in the third column of stripes takes on a tone Tz. Each of the first and fourth SPs takes on a tone which is obtained by performing rounding on $(Tx \times \frac{2}{3}) + (Ty \times \frac{1}{3}) = p$ and that each of the second and third SPs takes on a tone which is obtained by performing rounding on $(Ty \times \frac{1}{3}) + (Tz \times \frac{2}{3}) = v$.

9 Claims, 21 Drawing Sheets

(56) References Cited

U.S. PATENT DOCUMENTS

| | | |
|---|---|---|
| 2005/0134604 A1* | 6/2005 | Brown et al. ................. 345/611 |
| 2007/0206025 A1* | 9/2007 | Oka .............................. 345/611 |
| 2008/0266318 A1 | 10/2008 | Peeters et al. |
| 2009/0027410 A1 | 1/2009 | Inuzuka |
| 2009/0207182 A1 | 8/2009 | Takada et al. |

OTHER PUBLICATIONS

"How Sub-Pixel Font Rendering Works," https://www.grc.com/ctwhat.htm, downloaded Feb. 11, 2002, 8 pages.

Official Communication issued in International Patent Application No. PCT/JP2011/059204, mailed on Jul. 19, 2011.

* cited by examiner

JAGGED

US 8,907,878 B2

LIQUID CRYSTAL DISPLAY DEVICE AND METHOD FOR DISPLAYING FONTS ON LIQUID CRYSTAL DISPLAY DEVICE

TECHNICAL FIELD

The present invention relates to a display of characters on a liquid crystal display device having pixels each constituted by four subpixels having four different colors (e.g., red, green, blue, and white), respectively.

BACKGROUND ART

As an antialiasing technique for improving the viewability of characters on a liquid crystal display device, a technique (subpixel rendering) is currently under development which produces an antialiasing effect not at a pixel level but at a subpixel level by displaying different tones in a plurality of subpixels of each of those pixels falling on a character edge.

FIG. 14 is a schematic view showing the case of a standard display of a character line on a liquid crystal display device (three-color liquid crystal display device) having pixels each constituted by three subpixels, namely an R (red), a G (green), and a B (blue) subpixels. FIG. 15 is a schematic view of the case of a display of a subpixel rendered character line on the three-color liquid crystal display device. It should be noted that each subpixel takes on any one (8-bit data) of tones of 0 to 255, and the R, G, and B subpixels are abbreviated as "RSP", "GSP", and "BSP", respectively, as needed.

As shown in FIGS. 14 and 15, whereas RSP=255, GSP=255, and BSP=255 in each of the pixels P1 to P3 in FIG. 14, RSP=255, GSP=255, and BSP=0 in each of the pixels P1 to P3 in FIG. 15. Further, whereas RSP=255, GSP=255, and BSP=255 in each of the pixels P4 to P6 in FIG. 14, RSP=0, GSP=255, and BSP=0 in each of the pixels P4 to P6 in FIG. 15. This shows that an antialiasing effect is produced at a subpixel level in FIG. 15.

Meanwhile, with an aim to enhance the luminance of each pixel, a liquid crystal display device (multi-color liquid crystal display device is also currently under development which has pixels each constituted by subpixels of four or more different colors.

FIG. 16 is a schematic view showing the case of a standard display of a character line on a four-color liquid crystal display device having matrix arrangements of four subpixels, namely an R (red), a G (green), a B (blue), and a white (W) subpixels. It should be noted here that for a display on the four-color liquid crystal display device of RGB data premised on a three-color liquid crystal display device, RGBW data is created from the RGB data in the manner shown in FIG. 17. That is, in a case where it is specified in the RGB data that RSP=TX, GSP=TY, and BSP=TZ, such tones are specified in the RGBW data that RSP=j×TX−(smallest value among the tones TX to TZ), GSP=j×TY−(smallest value among the tones TX to TZ), BSP=j×TZ−(smallest value among the tones TX to TZ), and WSP=smallest value among the tones TX to TZ (where 1≤j≤2).

For example, in a case where it is specified in the RGB data that RSP=0, GSP=0, and BSP=0, it is specified in the RGBW data that RSP=1×0−(0)=0, GSP=1×0−(0)=0, BSP=1×0−(0)=0, and WSP=0. Alternatively, in a case where it is specified in the RGB data that RSP=255, GSP=255, and BSP=0, it is specified in the RGBW data that RSP=1×255−(0)=255, GSP=1×255−(0)=255, BSP=1×0−(0)=0, and WSP=0. Alternatively, in a case where it is specified in the RGB data that RSP=0, GSP=255, and BSP=255, it is specified in the RGBW data that RSP=1×0−(0)=0, GSP=1×255−(0)=255, BSP=1×255−(0)=255, and WSP=0.

FIG. 18 is a schematic view showing the case of a standard display of a character line on a four-color liquid crystal display device having stripe arrangements of four subpixels, namely an R (red), a G (green), a B (blue), and a white (W) subpixels. It should be noted here that for a display on the four-color liquid crystal display device of RGB data premised on a three-color liquid crystal display device, RGBW data is created from the RGB data in the manner shown in FIG. 19. That is, in a case where it is specified in the RGB data that RSP=TX, GSP=TY, and BSP=TZ, such tones are specified in the RGBW data that RSP=j×TX−(smallest value among the tones TX to TZ), GSP=j×TY−(smallest value among the tones TX to TZ), BSP=j×TZ−(smallest value among the tones TX to TZ), and WSP=smallest value among the tones TX to TZ (where 1≤j≤2).

For example, in a case where it is specified in the RGB data that RSP=0, GSP=0, and BSP=0, it is specified in the RGBW data that RSP=1×0−(0)=0, GSP=1×0−(0)=0, BSP=1×0−(0)=0, and WSP=0. Alternatively, in a case where it is specified in the RGB data that RSP=255, GSP=255, and BSP=0, it is specified in the RGBW data that RSP=1×255−(0)=255, GSP=1×255−(0)=255, BSP=1×0−(0)=0, and WSP=0. Alternatively, in a case where it is specified in the RGB data that RSP=0, GSP=255, and BSP=255, it is specified in the RGBW data that RSP=1×0−(0)=0, GSP=1×255−(0)=255, BSP=1×255−(0)=255, and WSP=0.

CITATION LIST

Patent Literature 1

Japanese Patent Application Publication, Tokukai, No. 2004-4839 A (Publication Date: Jan. 8, 2004)

SUMMARY OF INVENTION

Technical Problem

Since a subpixel rendered font (e.g., Clear Type (registered trademark) of Microsoft Corporation) is created on the premise of a three-color liquid crystal display device, there is such a problem that an attempt to display the font on such a multi-color liquid crystal display device as that described above results in failure to produce an appropriate antialiasing effect.

FIG. 20 is a schematic view showing the case of a display of RGBW data on a four-color liquid crystal display device having two-by-two matrix arrangements of an R, a G, a B, and a W subpixels, the RGBW data having been created in the manner shown in FIG. 17 from RGB data representing the subpixel rendered character line of FIG. 15. Since, in FIG. 15, it is specified in each of the pixels P1 to P3 that RSP=255, GSP=255, and BSP=0, it is specified in the RGBW data, for each of the pixels P1 to P3, that RSP=255, GSP=255, BSP=0, and WSP=0. FIG. 20 shows that the R and G subpixels, which are high in luminance, are conspicuous in each of the pixels P1 to P3 (to form a jagged edge on the left side of the character as shown in FIG. 20) and an appropriate antialiasing effect is not produced.

FIG. 21 is a schematic view showing the case of a display of RGBW data on a four-color liquid crystal display device having stripe arrangements of an R, a G, a B, and a W subpixels, the RGBW data having been created in the manner shown in FIG. 19 from RGB data representing the subpixel rendered character line of FIG. 15. Since, in FIG. 15, it is specified in each of the pixels P4 to P6 that RSP=0, GSP=255, and BSP=255, it is specified in the RGBW data, for each of the pixels P4 to P6, that RSP=0, GSP=255, BSP=255, and WSP=0. FIG. 21 shows that the G and B subpixels, which are high in luminance, are conspicuous in each of the pixels P4 to P6 (to form a jagged edge on the right side of the character as shown in FIG. 21) and an appropriate antialiasing effect is not produced.

The present invention is designed to produce an appropriate antialiasing effect when a four-color liquid crystal display device displays a subpixel rendered font.

Solution to Problem

A liquid crystal display device according the present invention is a liquid crystal display device including: pixels each composed of first to fourth subpixels having four different colors, respectively, the first to fourth subpixels being arranged in a two-by-two matrix, the first subpixel being placed in the first row and the first column, the second subpixel being placed in the first row and the second column, the third subpixel being placed in the second row and the second column, the fourth subpixel being placed in the second row and the first column, in displaying a font (i) subjected to subpixel rendering premised on a pixel composed of three subpixels having three different colors, respectively, the three subpixels being arranged in three columns of stripe, and (ii) specified, regarding a predetermined pixel falling on part of a character edge, that the subpixel in the first column takes on a tone Tx, that the subpixel in the second column takes on a tone Ty, and that the subpixel in the third column takes on a tone Tz, the liquid crystal display device specifying, regarding the predetermined pixel, that the first subpixel takes on a tone which is obtained by performing rounding on $\alpha \times (Tx \times Kb + Ty \times Ka) = p$, that the second subpixel takes on a tone which is obtained by performing rounding on $\beta \times (Ty \times Kc + Tz \times Kd) = q$, that the third subpixel takes on a tone which is obtained by performing rounding on $\gamma \times (Ty \times Ke + Tz \times Kf) = v$, and that the second subpixel takes on a tone which is obtained by performing rounding on $\delta \times (Tx \times Kh + Ty \times Kg) = u$, where $0 \leq Ka < Kb \leq 1$, $0 \leq Kc < Kd \leq 1$, $0 \leq Ke < Kf \leq 1$, $0 \leq Kg < Kh \leq 1$, and $\alpha$, $\beta$, $\gamma$, and $\delta$ are each a positive number.

The tone of each of the first and fourth subpixels located in the first column in each pixel of a four-color liquid crystal display device (i.e., a liquid crystal display device having pixels each composed of first to fourth subpixels having four different colors, respectively, arranged in a two-by-two matrix) that falls on part of a character edge is determined with a higher degree of contribution of the tone Tx of the subpixel located in the first column in each pixel of a three-color liquid crystal display device, and the tone of each of the second and third subpixels located in the second column in each pixel of the four-color liquid crystal display is determined with a higher degree of contribution of the tone Tz of the subpixel located in the third column in each pixel of the three-color liquid crystal display device. This makes it possible to produce an appropriate antialiasing effect on a font displayed on the four-color liquid crystal display device.

Advantageous Effects of Invention

As described above, the present invention can produce an appropriate antialiasing effect when a four-color liquid crystal display device displays a subpixel rendered font.

DESCRIPTION OF EMBODIMENTS

Figure 12:
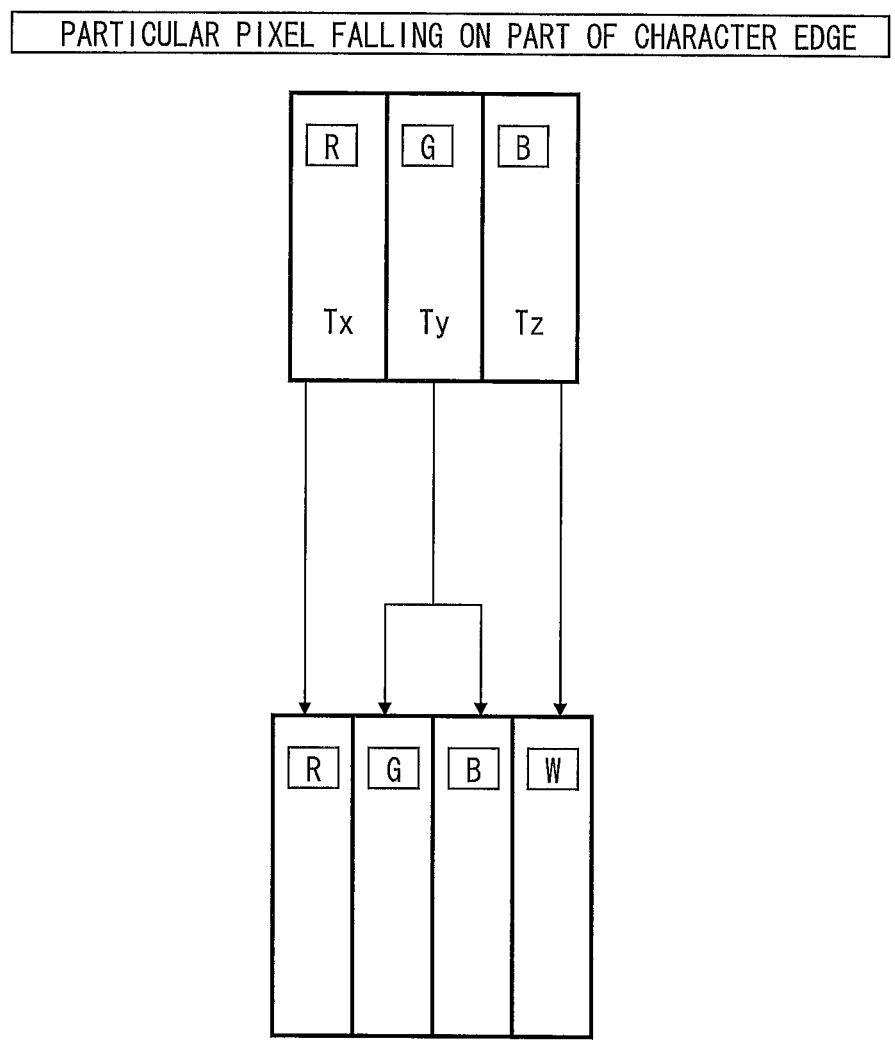
FIG. 12 is an explanatory diagram showing still another method for creating RGBW data (for a particular pixel) according to Embodiment 2.
Figure 13:
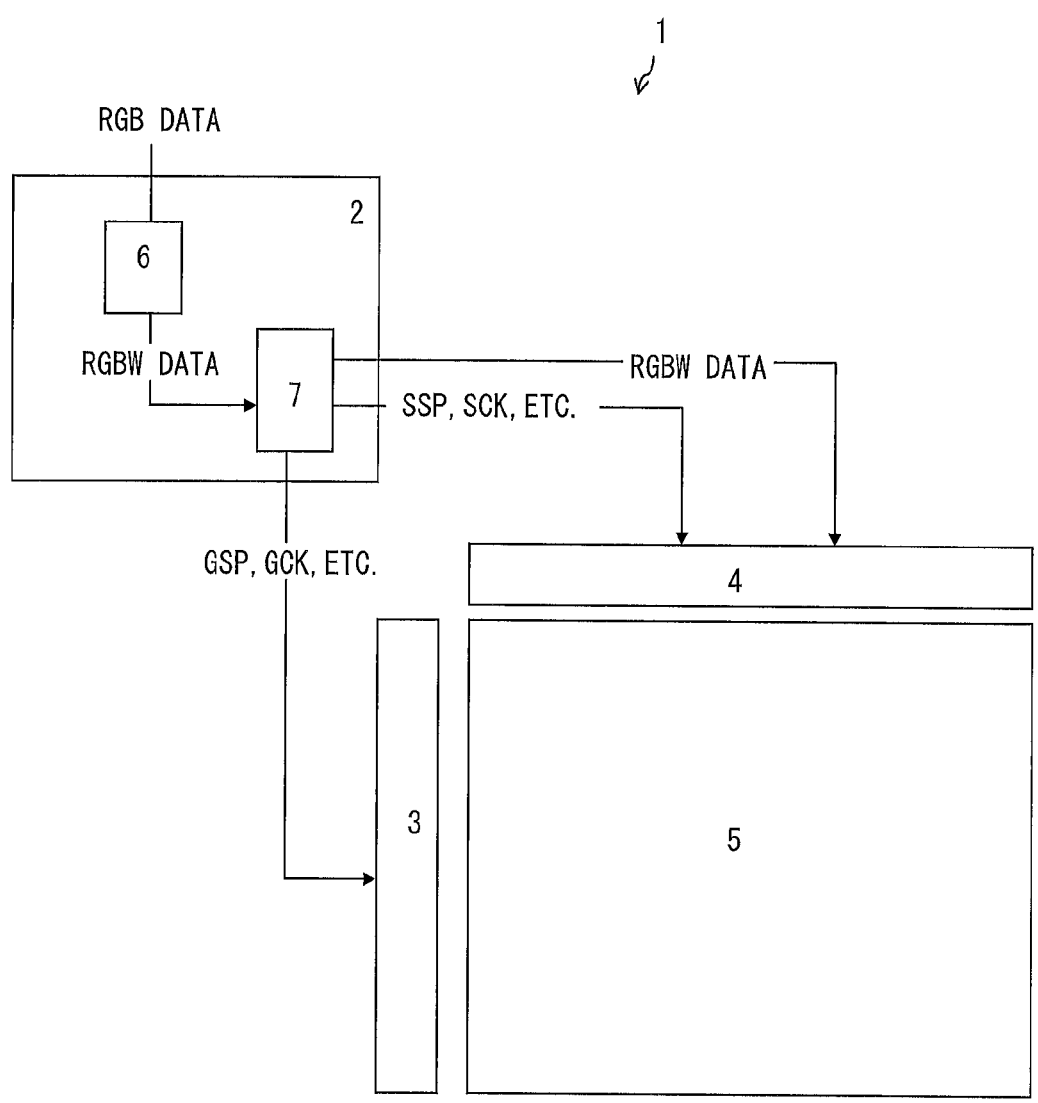
FIG. 13 is a block diagram showing a configuration of a liquid crystal display device according to an embodiment of the present invention.
Figure 14:
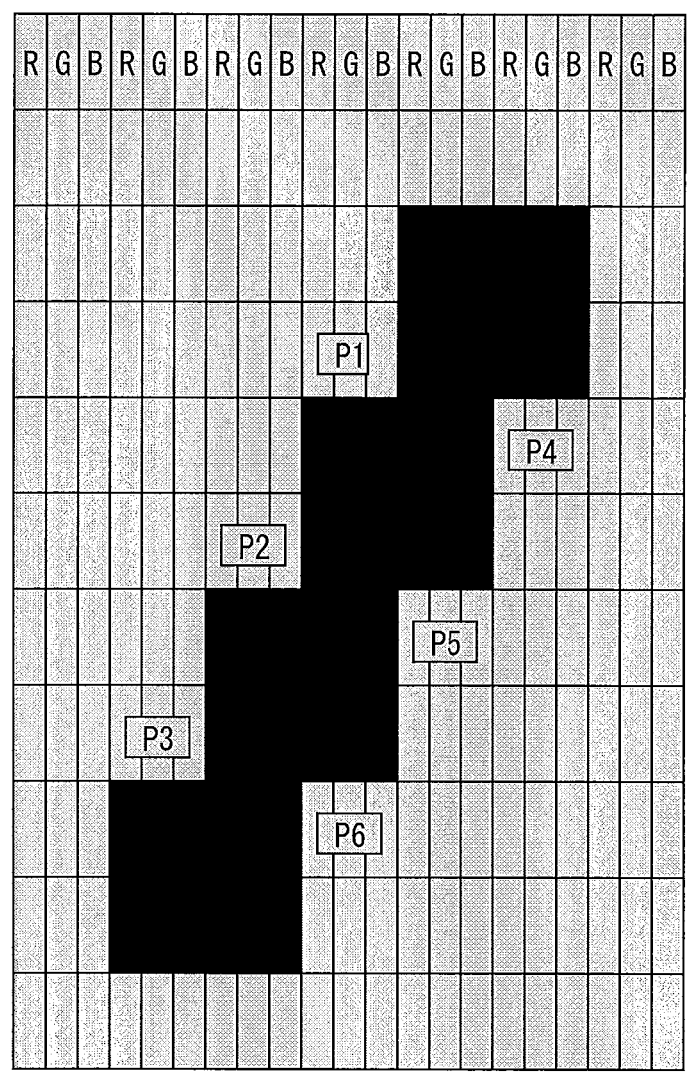
FIG. 14 is a schematic view showing a display state of a standard font (without subpixel rendering) on a three-color liquid crystal display device.

An embodiment of the present invention is described below with reference to FIGS. 1 to 13, 15, 20, and 21. As shown in FIG. 13, a liquid crystal display device according to the present embodiment includes a display control circuit 2, a gate driver 3, a source driver 4, and a liquid crystal panel 5. It should be noted that the gate driver 3 and the source driver 4 may be formed monolithically with the liquid crystal panel 5.

The liquid crystal display device 1 is a four-color liquid crystal display device, and the liquid crystal panel 5 has pixels each composed of four subpixels having four different colors (R, G, B, and W), respectively. The R, G, B, and W subpixels are referred to below as "RSP", "GSP", "BSP", and "WSP", respectively, as needed.

The display control circuit 2 includes a data conversion circuit 6 and a timing control circuit 7. The data conversion circuit 6 receives RGB data, creates RGBW data from the RGB data (which will be described later in detail), and then outputs the RGBW data to the timing control circuit 7. The timing control circuit 7 outputs a source start pulse SSP, a source clock SCK, etc., as well as the RGBW data, to the source driver 4, and outputs a gate start pulse GSP, a gate clock GCK, etc. to the gate driver 3.

The source driver 4 drives source lines (data signal lines, not illustrated) of the liquid crystal panel 5 with use of the source start pulse SSP, the source clock SCK, etc., as well as the RGBW data. The gate driver 3 drives gate lines (scanning signal lines, not illustrated) of the liquid crystal panel 5 with use of the gate start pulse GSP, the gate clock GCK, etc.

The following describes a method for creating RGBW data of a subpixel rendered font (e.g., ClearType (registered trademark) of Microsoft Corporation) premised on an R, a G, and a B subpixels arranged in three columns of stripe.

Embodiment 1

The liquid crystal panel 5 has pixels each constituted by first to fourth subpixels having four different colors, respectively, arranged in a two-by-two matrix (with the first to fourth subpixels being placed in the first row and the first column, in the first row and the second column, in the second row and the second column, and in the second row and the first column, respectively). When it is specified in the font (RGB data), for a particular pixel falling on part of a character edge, that the subpixel in the first column takes on a tone Tx, that the subpixel in the second column takes on a tone Ty, and that the subpixel in the third column takes on a tone Tz, it is specified in the RGBW data, for the particular pixel, that the first subpixel takes on a tone which is obtained by performing rounding on $\alpha \times (Tx \times Kb + Ty \times Ka) = p$, that the second subpixel takes on a tone which is obtained by performing rounding on $\beta \times (Ty \times Kc + Tz \times Kd) = q$, that the third subpixel takes on a tone which is obtained by performing rounding on $\gamma \times (Ty \times Ke + Tz \times Kf) = v$, and that the fourth subpixel takes on a tone which is obtained by performing rounding on $\delta \times (Tx \times Kh + Ty \times Kg) = u$, where $0 \leq Ka < Kb \leq 1$, $0 \leq Kc < Kd \leq 1$, $0 \leq Ke < Kf \leq 1$, $0 \leq Kg < Kh \leq 1$, and $\alpha$, $\beta$, $\gamma$, and $\delta$ are each a positive number.

Figure 1:
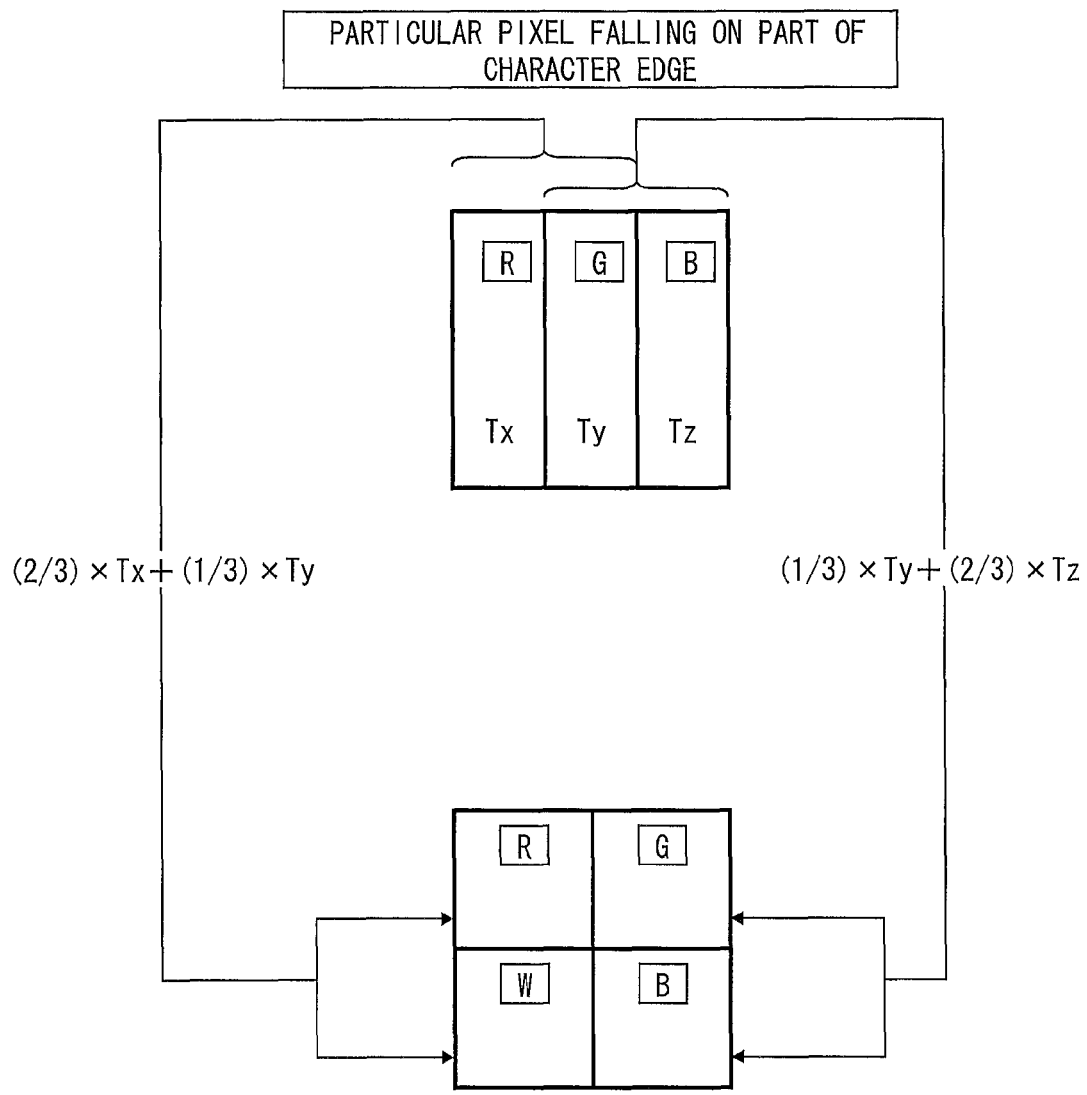
FIG. 1 is an explanatory diagram showing a method for creating RGBW data (for a particular pixel) according to Embodiment 1.
Figure 2:
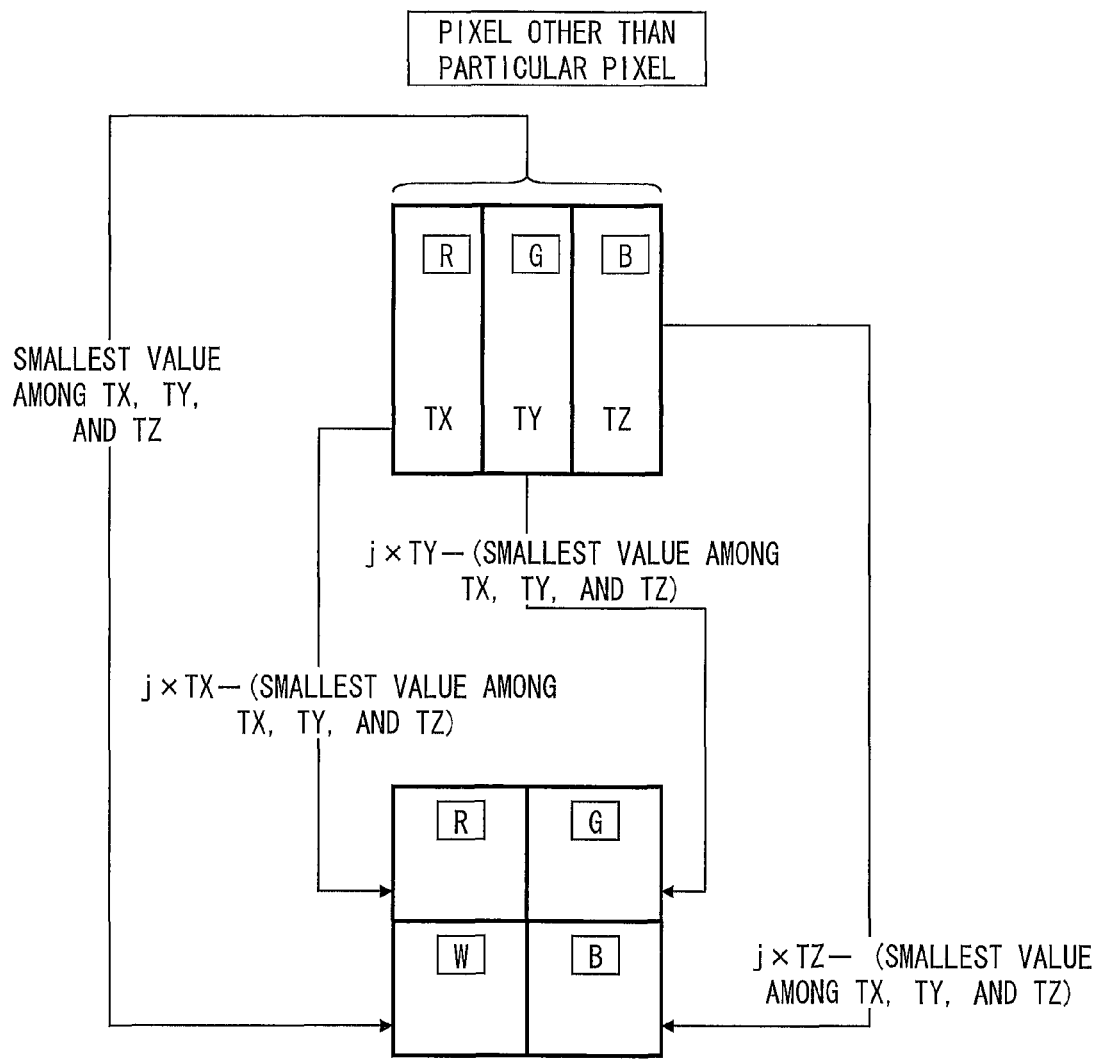
FIG. 2 is an explanatory diagram showing a method for creating RGBW data (for a pixel other than the particular pixel) according to Embodiment 1.

It is preferable that $Ka=Kc=Ke=Kg=1/3$, $Kb=Kd=Kf=Kh=2/3$, and $\alpha=\beta=\gamma=\delta=1$. See a case where each pixel of the liquid crystal panel 5 has an R subpixel (RSP), a G subpixel (GSP), a B subpixel (BSP), and a W subpixel (WSP) placed in the first row and the first column, in the first row and the second column, in the second row and the second column, and in the second row and the first column, respectively. In this case, when it is specified in the font (RGB data), for a particular pixel falling on part of a character edge (such a pixel as the pixels P1 to P6 of FIG. 15, which shows an example of a display of the font on a three-color liquid crystal display device), that the R subpixel in the first column takes on a tone Tx, that the G subpixel in the second column takes on a tone Ty, and that the B subpixel in the third column takes on a tone Tz, it is specified in the RGBW data, as shown in FIG. 1, that the RSP and WSP of the particular pixel each take on a tone which is obtained by rounding $(2/3) \times Tx + (1/3) \times Ty$ down to the nearest whole number and that the GSP and BSP of the particular pixel takes on a tone which is obtained by rounding $(1/3) \times Ty + (2/3) \times Tz$ down to the nearest whole number. Further, when it is specified in the font (RGB data), for a pixel other than the particular pixel, that the R subpixel in the first column takes on a tone TX, that the G subpixel in the second column takes on a tone TY, and that the B subpixel in the third column takes on a tone TZ, it is specified in the RGBW data, as shown in FIG. 2, that RSP=j×TX−(smallest value among the tones TX, TY, and TZ), GSP=j×TY−(smallest value among the tones TX, TY, and TZ), BSP=j×TZ−(smallest value among the tones TX, TY, and TZ), and WSP=smallest value among the tones TX, TY, and TZ (where $1 \leq j \leq 2$).

Figure 3:
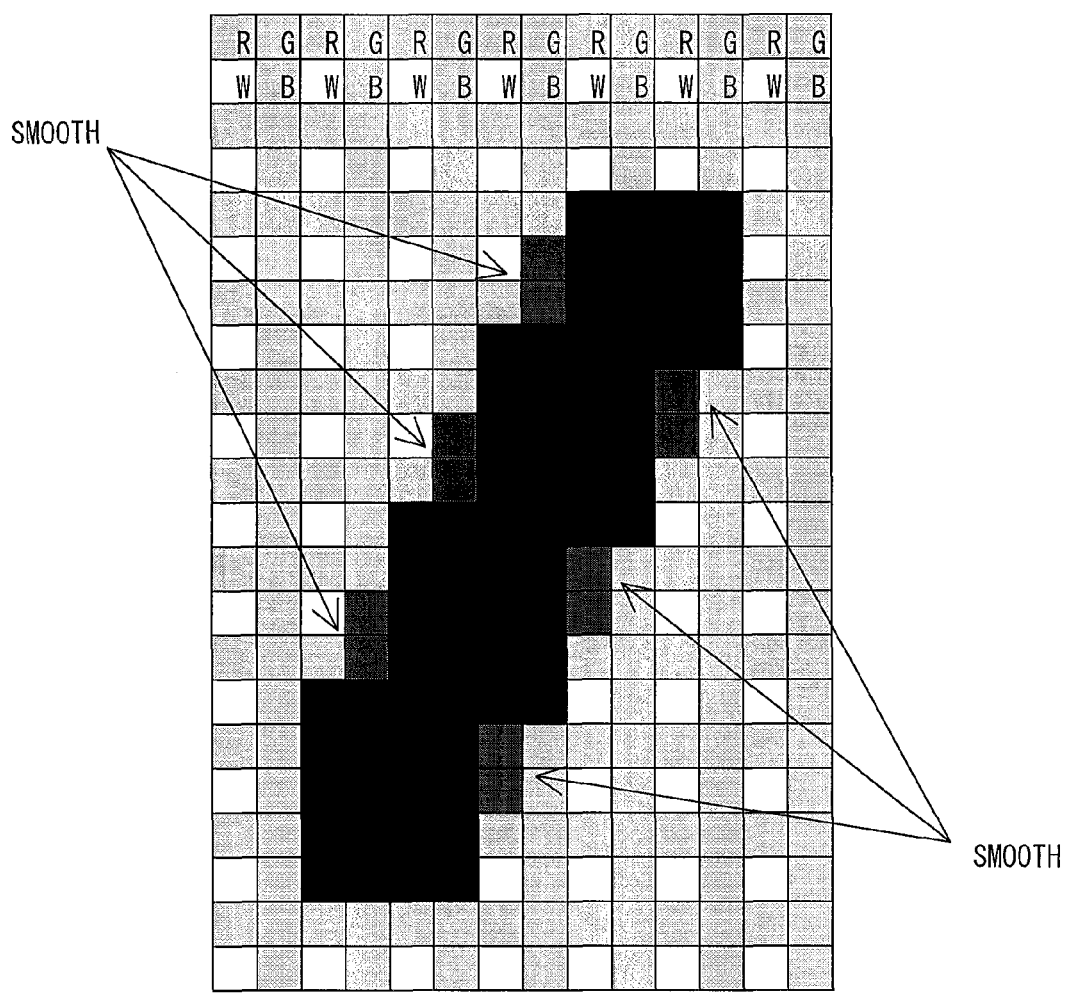
FIG. 3 is a schematic view showing a display state of RGBW data created in the manners shown in FIGS. 1 and 2.
Figure 15:
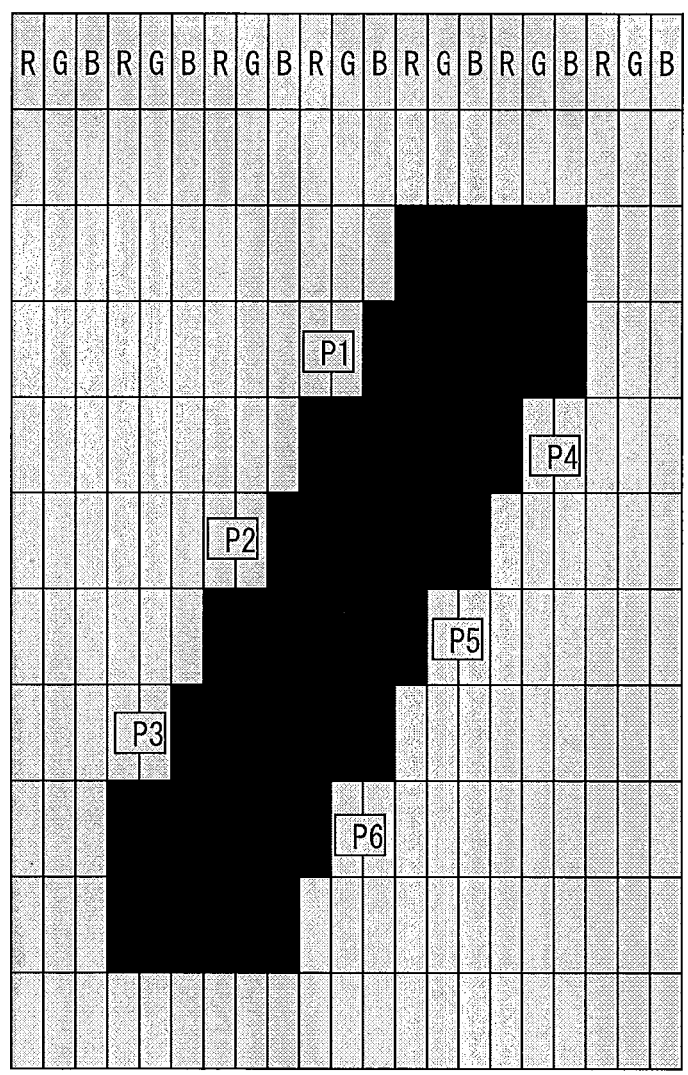
FIG. 15 is a schematic view showing a display state of a font (with subpixel rendering) on a three-color liquid crystal display device.
Figure 16:
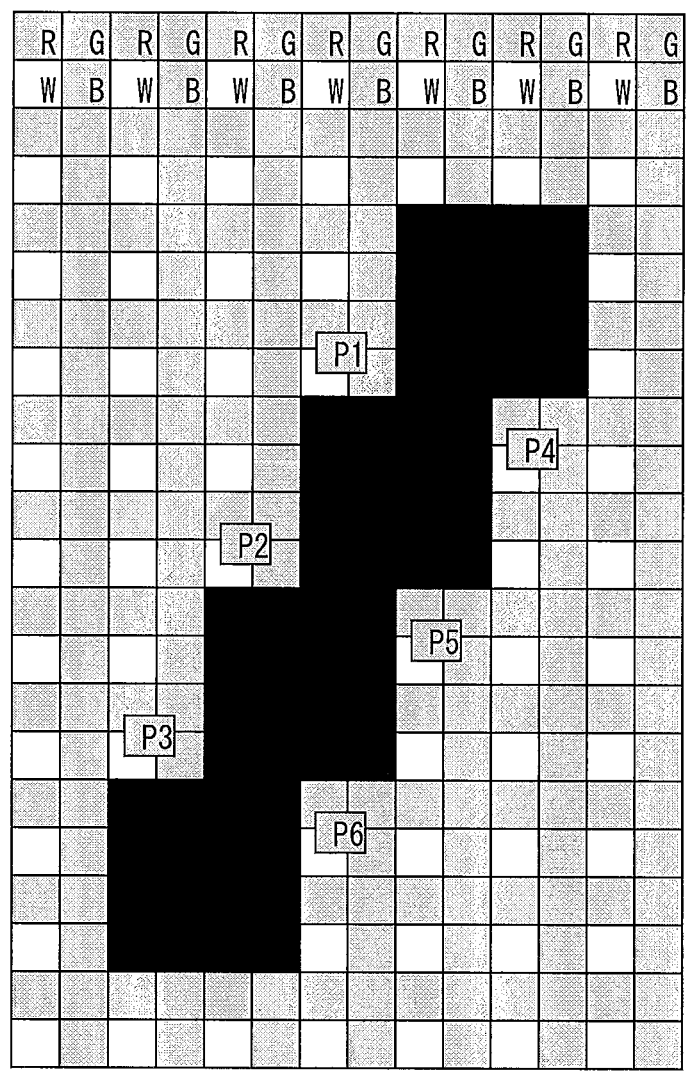
FIG. 16 is a schematic view showing a display state of a font (without subpixel rendering) on a (matrix) four-color liquid crystal display device.
Figure 17:
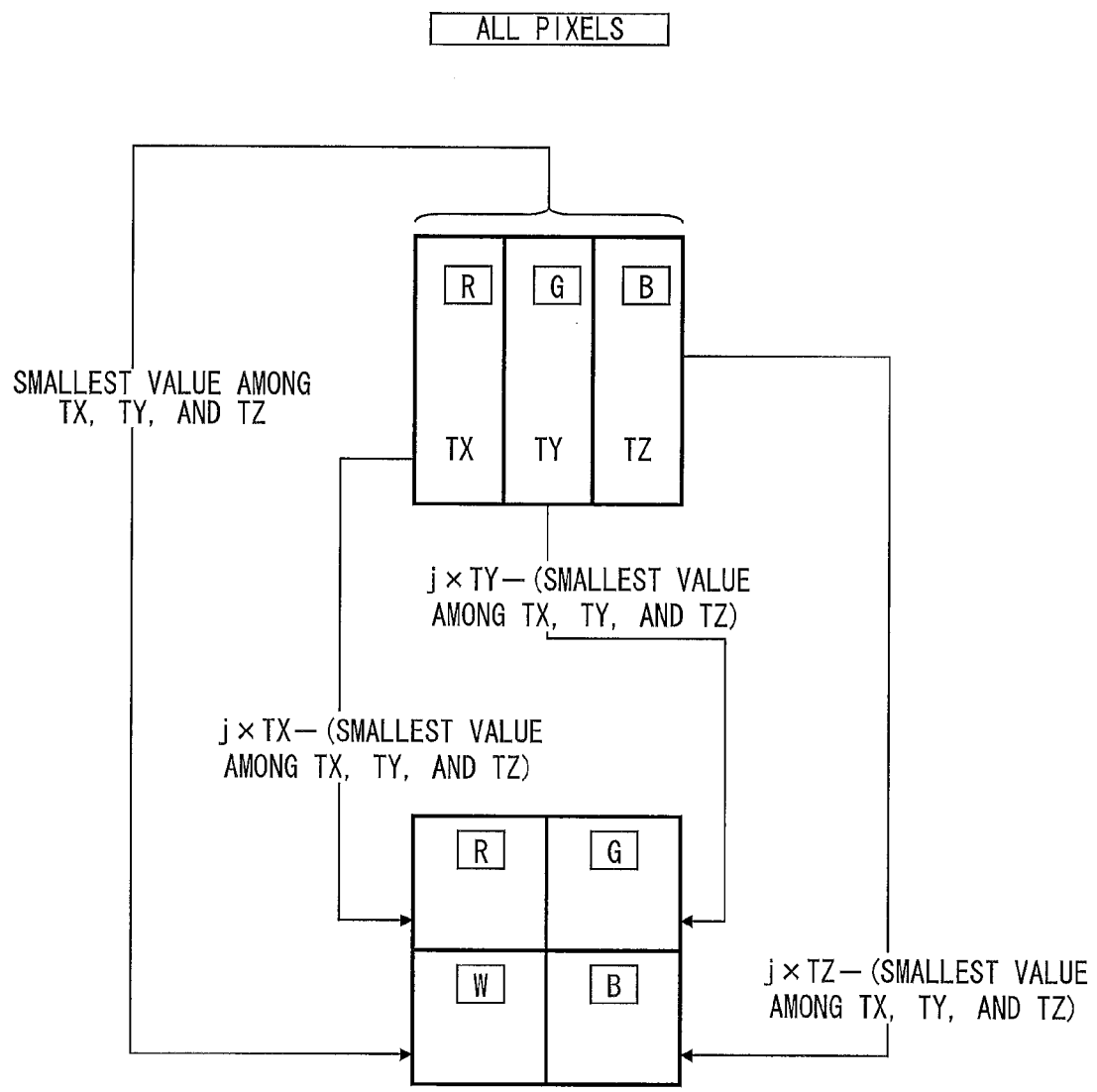
FIG. 17 is an explanatory diagram showing a method for creating (matrix-compatible) RGBW data in a conventional liquid crystal display device.
Figure 18:
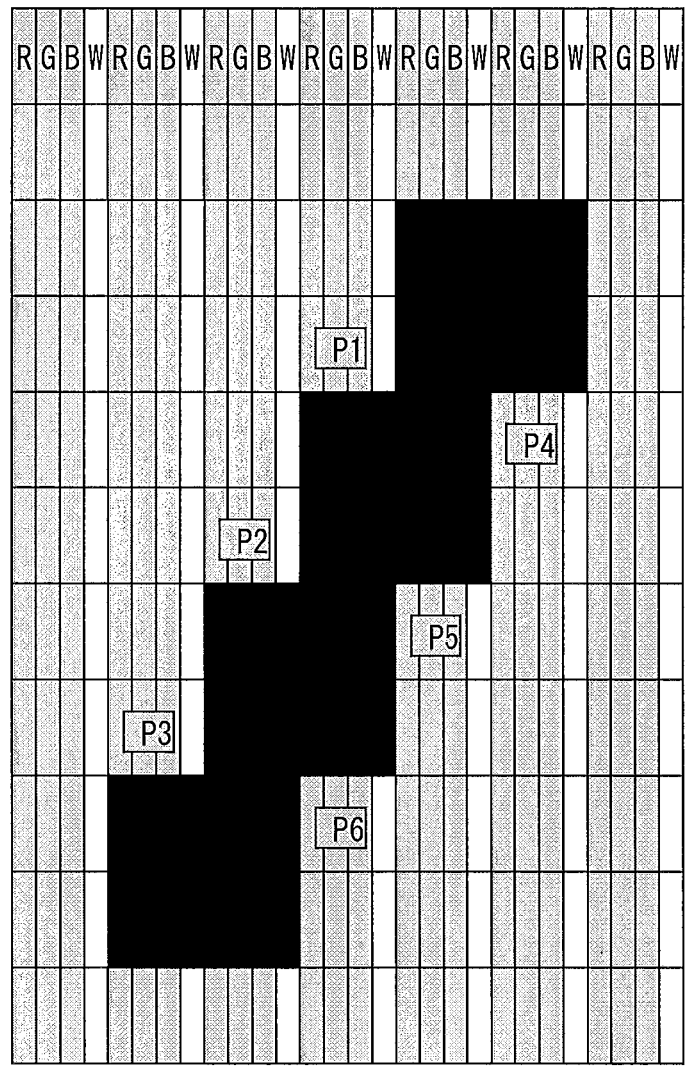
FIG. 18 is a schematic view showing a display state of a font (without subpixel rendering) on a (stripe) four-color liquid crystal display device.
Figure 19:
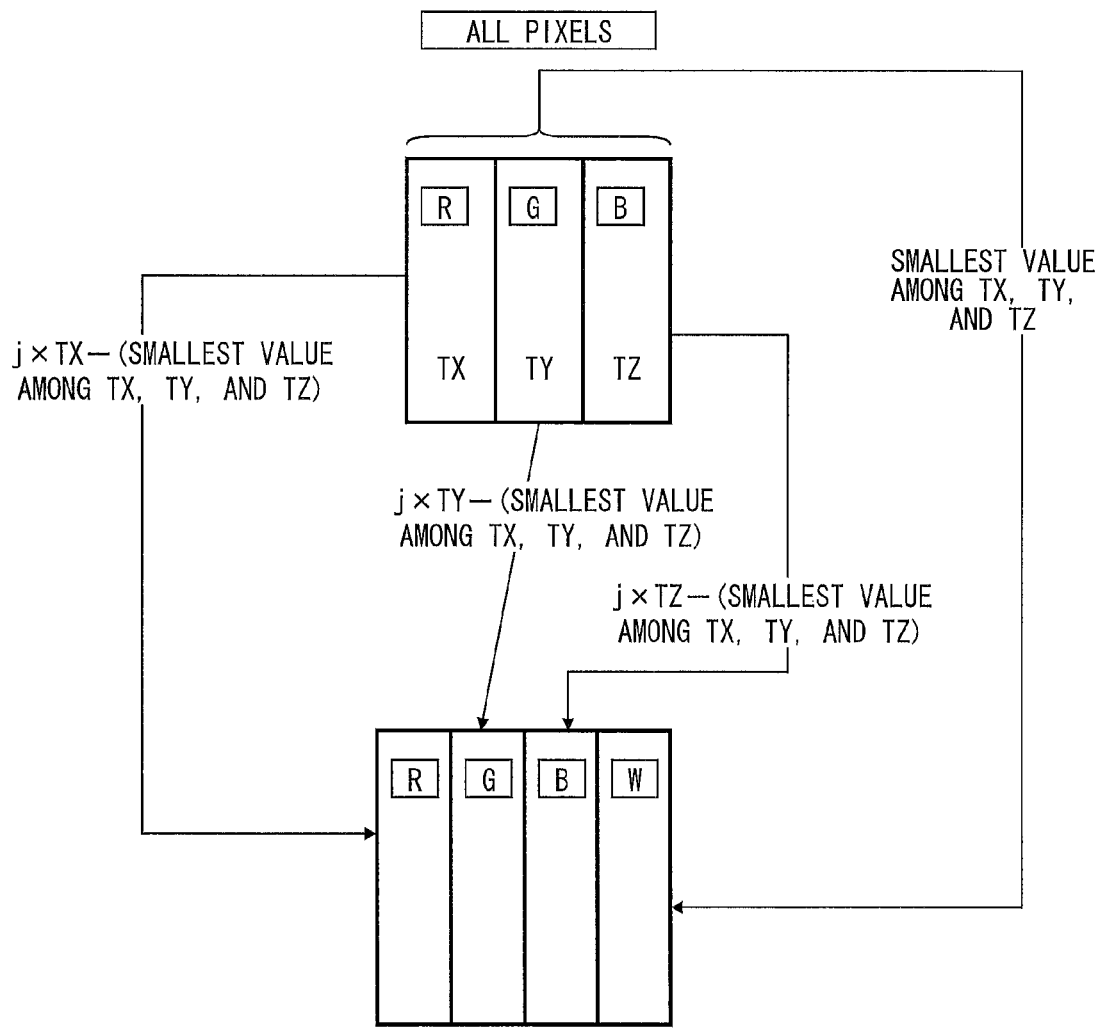
FIG. 19 is an explanatory diagram showing a method for creating (stripe-compatible) RGBW data in a conventional liquid crystal display device.
Figure 20:
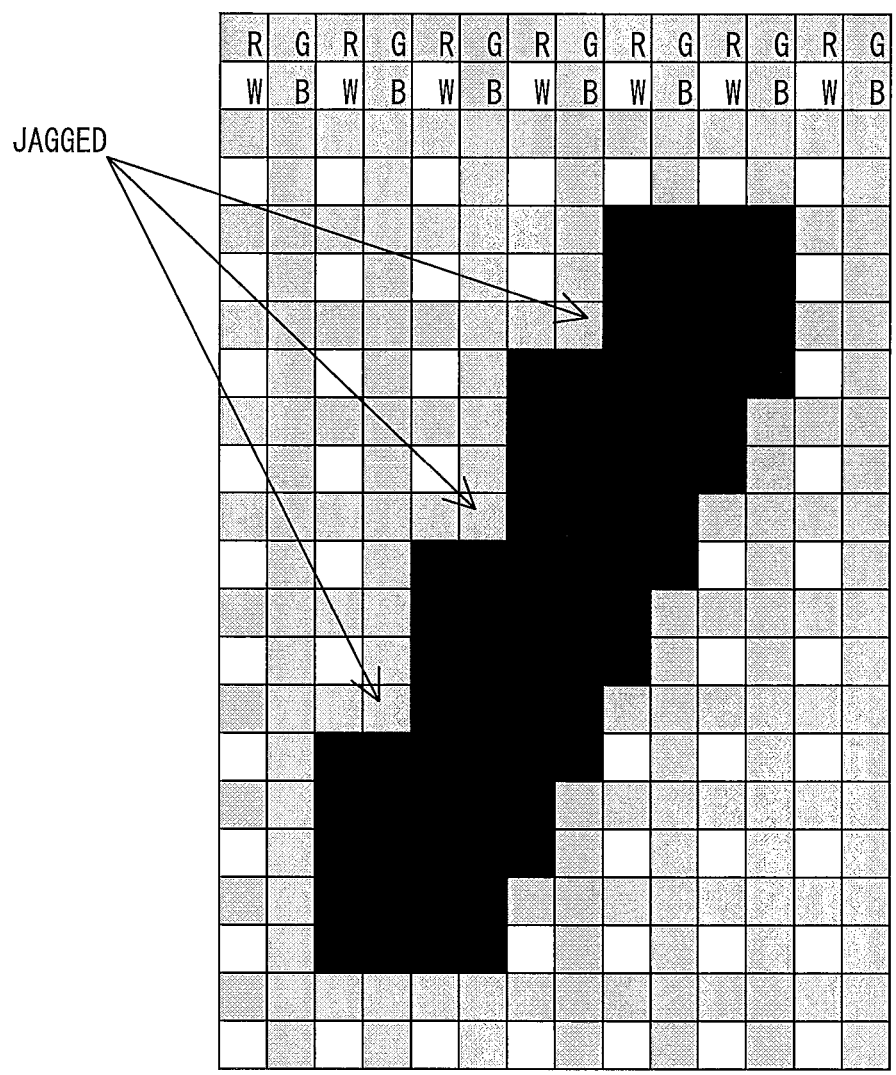
FIG. 20 is a schematic view showing a display state of a font (with subpixel rendering) on a conventional (matrix) four-color liquid crystal display device.
Figure 21:
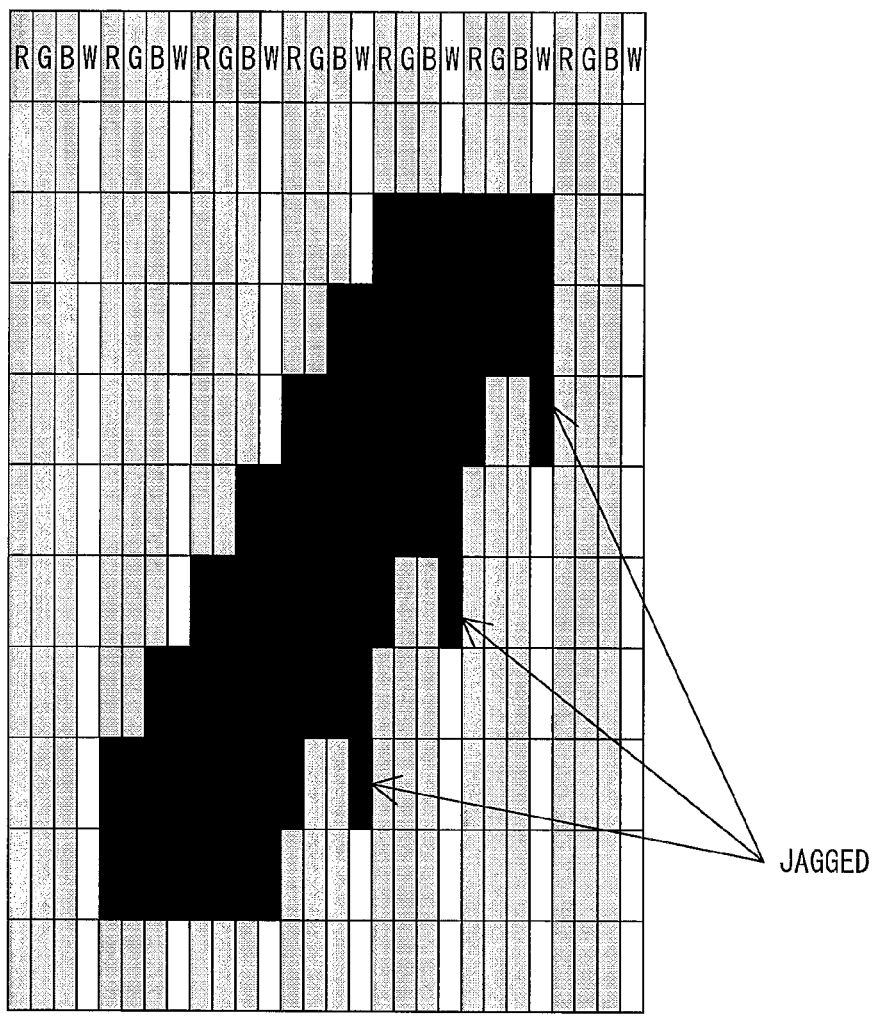
FIG. 21 is a schematic view showing a display state of a font (with subpixel rendering) on a conventional (stripe) four-color liquid crystal display device.

Since, in FIG. 15, it is specified in each of the pixels P1 to P3 that RSP=255, GSP=255, and BSP=0, it is specified in the RGBW data, for each of the pixels P1 to P3, that RSP=255, GSP=85, BSP=85, and WSP=255 (see FIG. 3). Further, since, in FIG. 15, it is specified in each of the pixels P4 to P6 that RSP=0, GSP=255, and BSP=255, it is specified in the RGBW data, for each of the pixels P4 to P6, that RSP=85, GSP=225, BSP=2255, and WSP=85 (see FIG. 3). FIG. 3 shows that a smoother character edge is displayed than in FIG. 20 and an appropriate antialiasing effect is produced.

Figure 4:
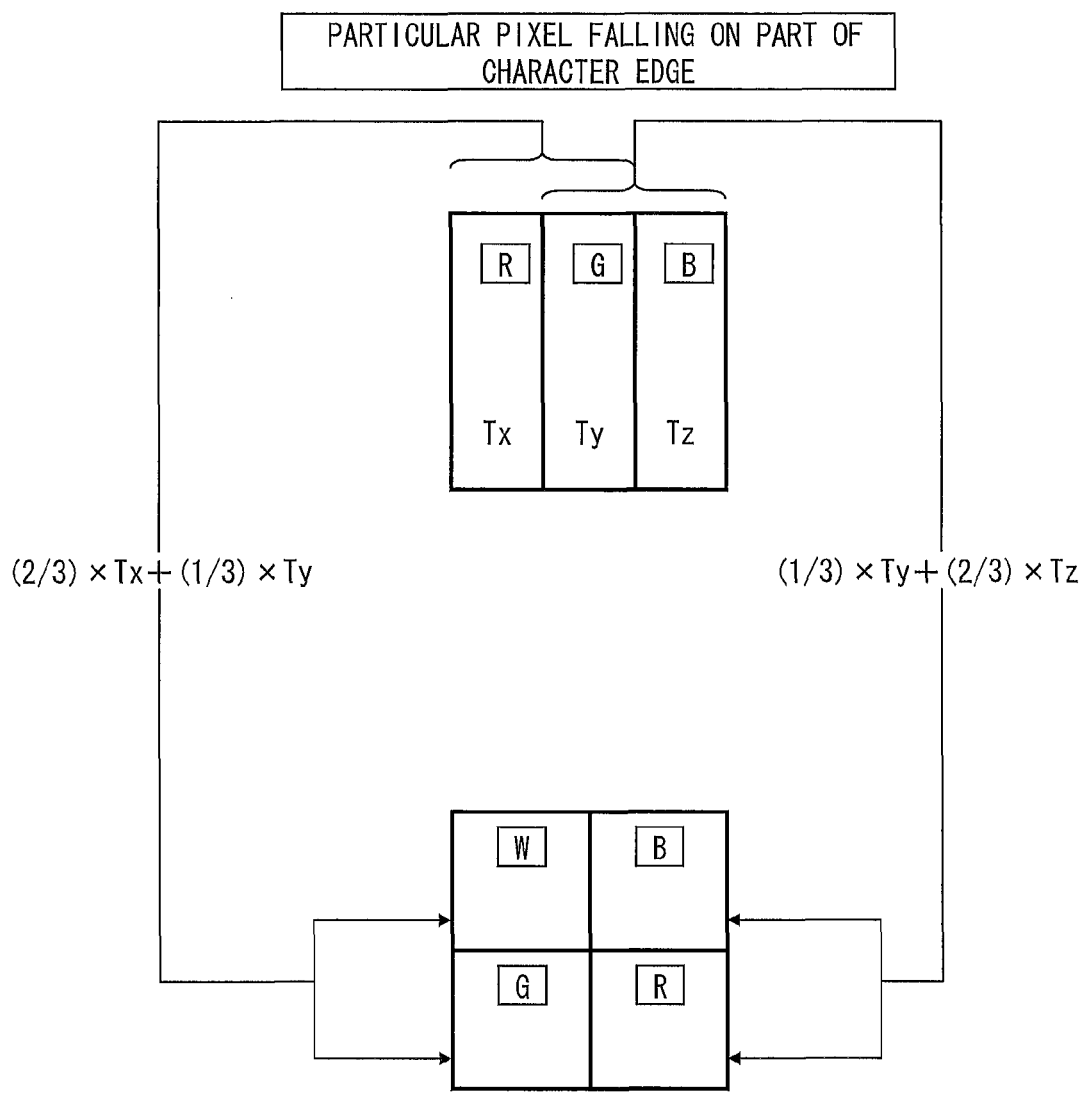
FIG. 4 is an explanatory diagram showing a method for creating RGBW data (for a pixel other than the particular pixel) with a different color arrangement of subpixels.

For example, see a case where each pixel of the liquid crystal panel 5 has a W subpixel (WSP), a B subpixel (BSP), an R subpixel (RSP), and a G subpixel (GSP) placed in the first row and the first column, in the first row and the second column, in the second row and the second column, and in the second row and the first column, respectively. In this case, when it is specified in the font (RGB data), for a particular pixel falling on part of a character edge (such a pixel as the pixels P1 to P6 of FIG. 15, which shows an example of a display of the font on a three-color liquid crystal display device), that the RSP takes on a tone Tx, that the GSP takes on a tone Ty, and that the BSP takes on a tone Tz, it is specified in the RGBW data, as shown in FIG. 4, that the WSP and GSP of the particular pixel each take on a tone which is obtained by rounding $(2/3) \times Tx + (1/3) \times Ty$ down to the nearest whole number and that the BSP and RSP of the particular pixel each take on a tone which is obtained by rounding $(1/3) \times Ty + (2/3) \times Tz$ down to the nearest whole number.

The method for creating RGBW data in a case where the liquid crystal panel 5 has pixels each constituted by four subpixels having four different colors, respectively, arranged in a two-by-two matrix is not limited to that described above.

Figure 5:
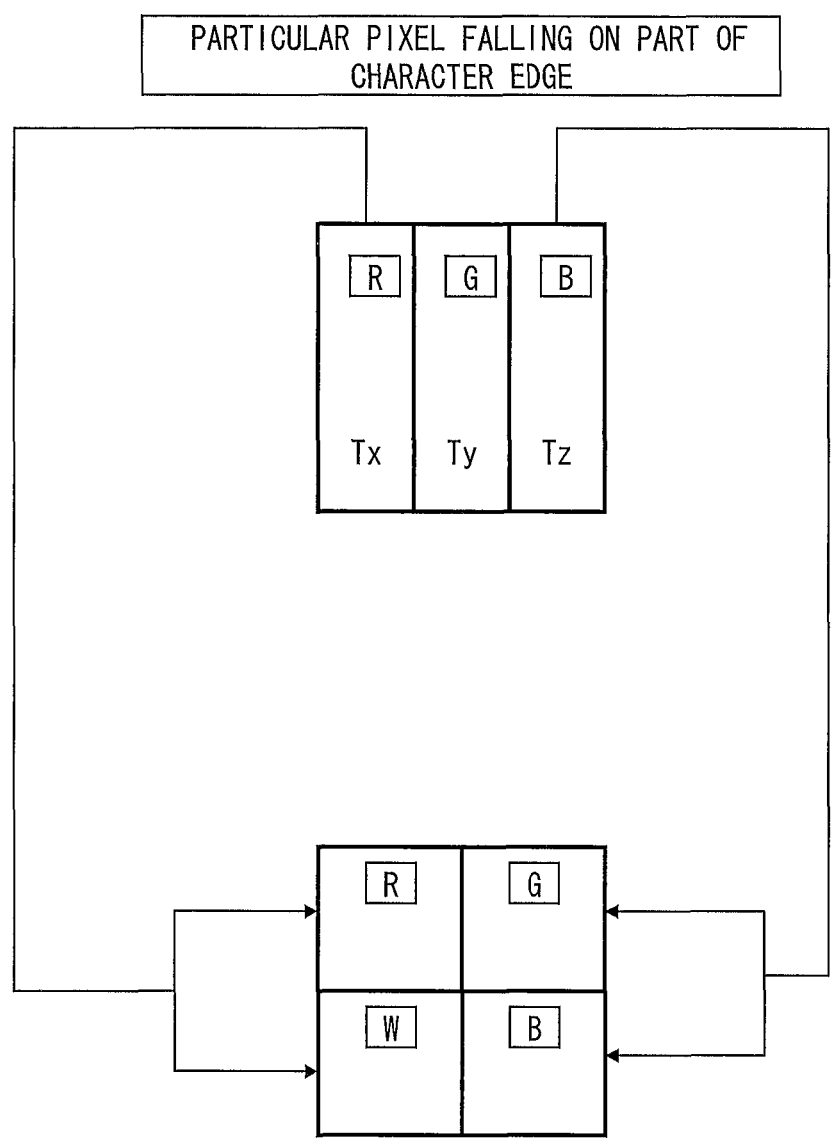
FIG. 5 is an explanatory diagram showing another method for creating RGBW data (for a particular pixel) according to Embodiment 1.

For example, let it be assumed that Ka=Kc=Ke=Kg=0, Kb=Kd=Kf=Kh=1, and $\alpha=\beta=\gamma=\delta=1$, and see a case where each pixel of the liquid crystal panel 5 has an R subpixel (RSP), a G subpixel (GSP), a B subpixel (BSP), and a W subpixel (WSP) placed in the first row and the first column, in the first row and the second column, in the second row and the second column, and in the second row and the first column, respectively. In this case, when it is specified in the font (RGB data), for a particular pixel falling on part of a character edge (such a pixel as the pixels P1 to P6 of FIG. 15, which shows an example of a display of the font on a three-color liquid crystal display device), that the RSP takes on a tone Tx, that the GSP takes on a tone Ty, and that the BSP takes on a tone Tz, it can also be specified in the RGBW data, as shown in FIG. 5, that the RSP and WSP of the particular pixel each take on the tone Tx and that the GSP and BSP of the particular pixel each take on the tone Tz.

Figure 6:
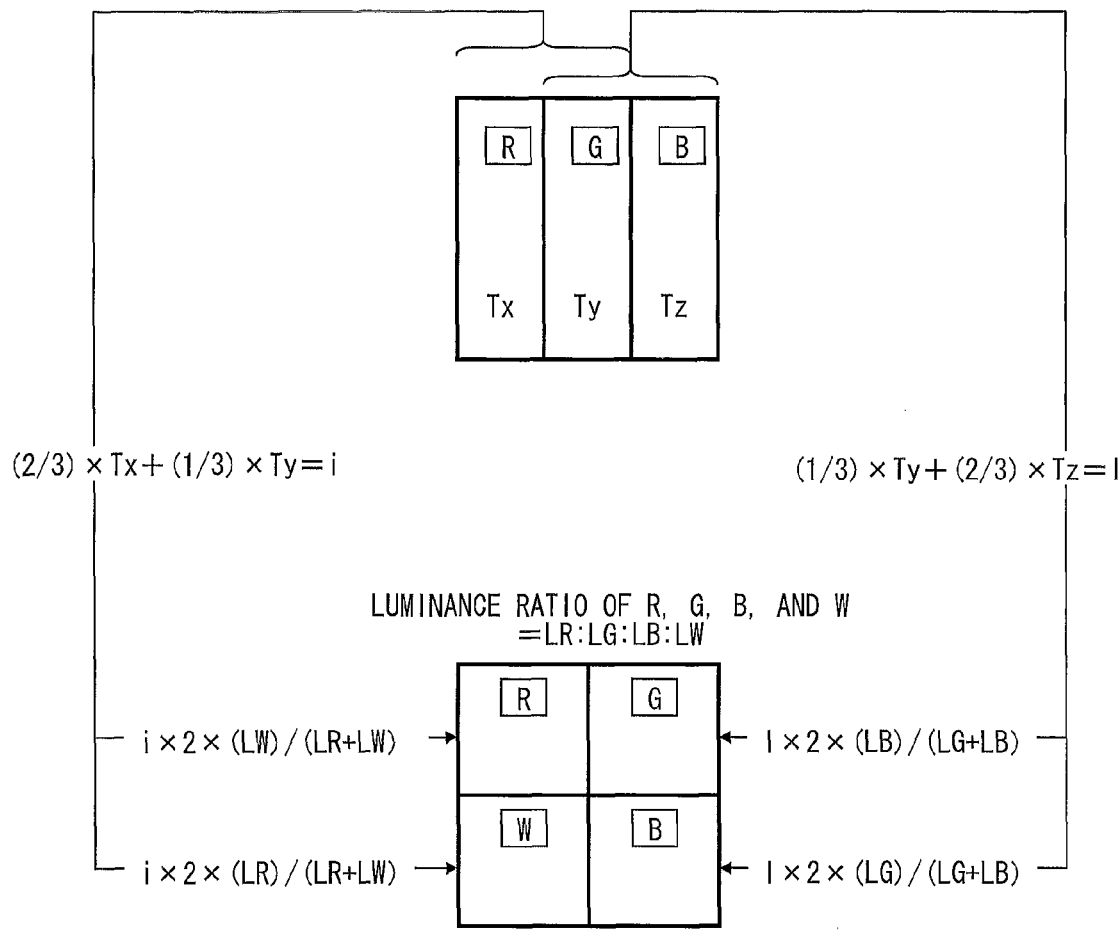
FIG. 6 is an explanatory diagram showing a modification of the method of data creation (for a particular pixel) of FIG. 1.

Further, when the R, G, B, and W subpixels display identical tones with a luminance ratio of LR:LG:LB:LW (e.g., 0.298:0.586:0.114:1), it can also be specified in FIG. 1 that $\alpha=2\times(LW)/(LR+LW)$, $\beta=2\times(LB)/(LG+LB)$, $\gamma=2\times(LG)/(LG+LB)$, and $\delta=2\times(LR)/(LR+LW)$. That is, it can also be specified in the RGBW data, as shown in FIG. 6, that the RSP of a particular pixel falling on part of a character edge takes on a tone which is obtained by rounding $(\frac{2}{3})\times Tx+(\frac{1}{3})\times Ty\times(LW)/(LR+LW)$ to the nearest whole number, that the GSP of the particular pixel takes on a tone which is obtained by rounding $(\frac{1}{3})\times Ty+(\frac{2}{3})\times Tz\times(LB)/(LG+LB)$ to the nearest whole number, that the BSP of the particular pixel takes on a tone which is obtained by rounding $(\frac{1}{3})\times Ty+(\frac{2}{3})\times Tz\times(LG)/(LG+LB)$ to the nearest whole number, and that the WSP of the particular pixel takes on a tone which is obtained by rounding $(\frac{2}{3})\times Tx+(\frac{1}{3})\times Ty\times(LR)/(LR+LW)$ to the nearest whole number. This produces a more appropriate antialiasing effect.

Embodiment 2

The liquid crystal panel 5 has pixels each constituted by first to fourth subpixels having four different colors, respectively, arranged in four columns of stripe (with the first to fourth subpixels being placed in the first to fourth columns, respectively). When it is specified in the font (RGB data), for a particular pixel falling on part of a character edge, that the subpixel in the first column takes on a tone Tx, that the subpixel in the second column takes on a tone Ty, and that the subpixel in the third column takes on a tone Tz, it is specified in the RGBW data, for the particular pixel, that the first subpixel takes on a tone which is obtained by performing rounding on $\alpha\times(Tx\times KB+Ty\times KA)=P$, that the second subpixel takes on a tone which is obtained by performing rounding on $\beta\times(Tx\times KC+Ty\times KD)=Q$, that the third subpixel takes on a tone which is obtained by performing rounding on $\gamma\times(Ty\times KE+Tz\times KF)=V$, and that the fourth subpixel takes on a tone which is obtained by performing rounding on $\delta\times(Ty\times KG+Tz\times KH)=U$, where $0\leq KA<KB\leq 1$, $0\leq KC\leq 1$, $0\leq KD\leq 1$, $0\leq KE\leq 1$, $0\leq KF\leq 1$, $0\leq KG<KH\leq 1$, and $\alpha$, $\beta$, $\gamma$, and $\delta$ are each a positive number.

Figure 7:
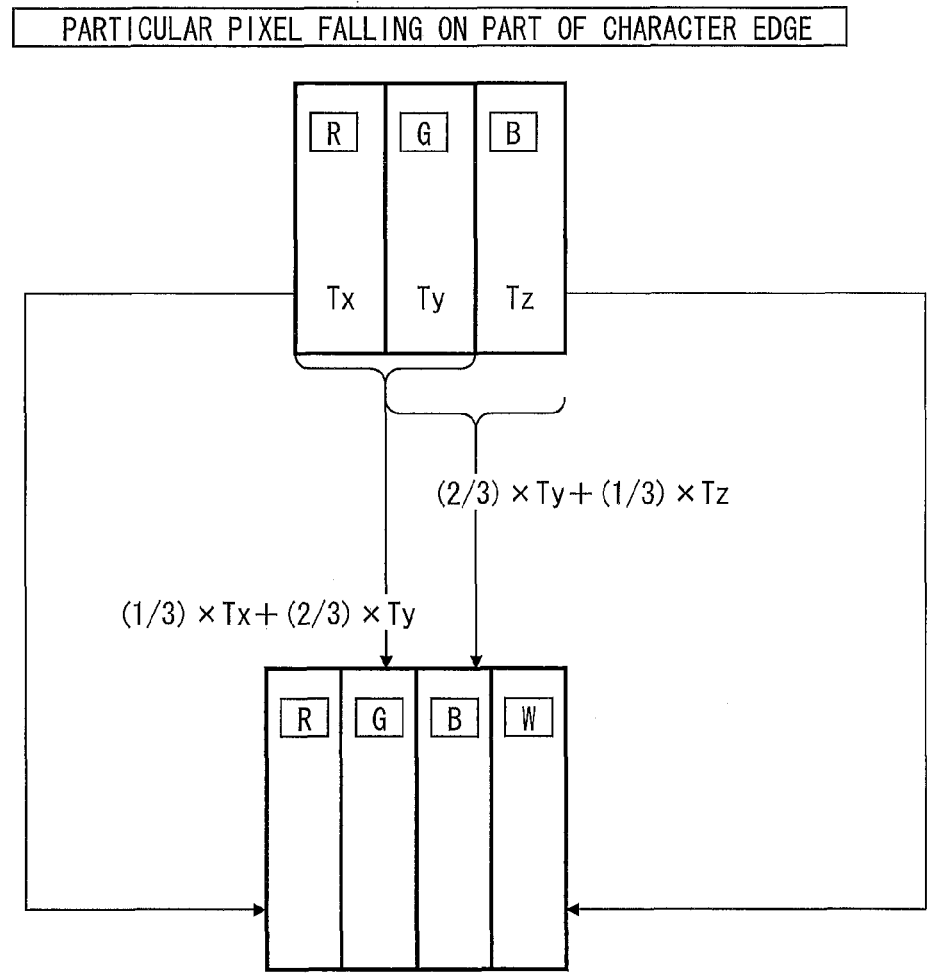
FIG. 7 is an explanatory diagram showing a method for creating RGBW data (for a particular pixel) according to Embodiment 2.
Figure 8:
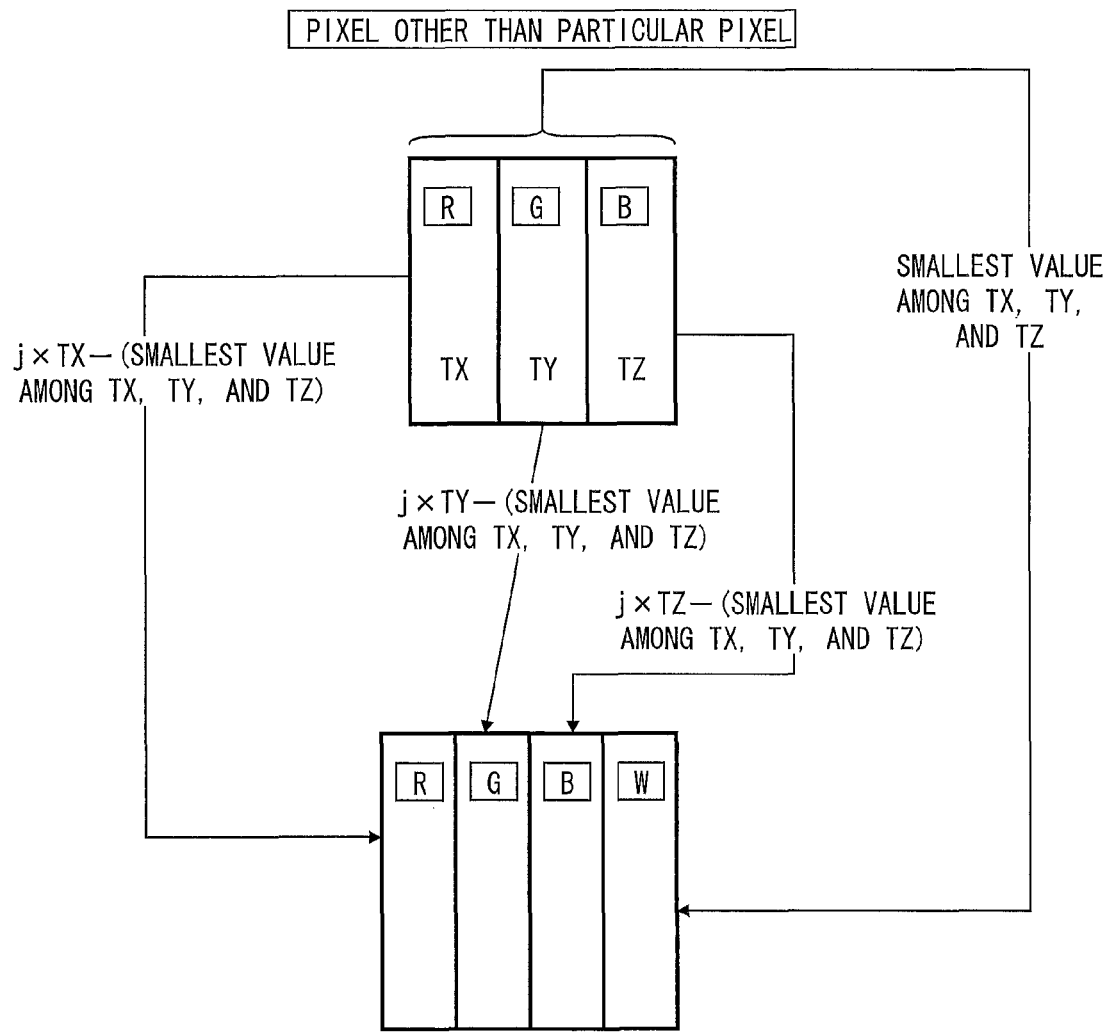
FIG. 8 is an explanatory diagram showing a method for creating RGBW data (for a pixel other than the particular pixel) according to Embodiment 1.

It is preferable that $KA=KG=0$, $KB=KH=1$, $KC=KF=\frac{1}{3}$, $KD=KE=\frac{2}{3}$, and $\alpha=\beta=\gamma=\delta=1$. See a case where each pixel of the liquid crystal panel 5 has an R subpixel (RSP), a G subpixel (GSP), a B subpixel (BSP), and a W subpixel (WSP) placed in the first to fourth columns, respectively. In this case, when it is specified in the font (RGB data), for a particular pixel falling on part of a character edge (such a pixel as the pixels P1 to P6 of FIG. 15, which shows an example of a display of the font on a three-color liquid crystal display device), that the R subpixel in the first column takes on a tone Tx, that the G subpixel in the second column takes on a tone Ty, and that the B subpixel in the third column takes on a tone Tz, it is specified in the RGBW data, as shown in FIG. 7, that the RSP of the particular pixel takes on the tone Tx, that the GSP of the particular pixel takes on a tone which is obtained by rounding $(\frac{1}{3})\times Tx+(\frac{2}{3})\times Ty$ down to the nearest whole number, that the BSP of the particular pixel takes on a tone which is obtained by rounding $(\frac{2}{3})\times Ty+(\frac{1}{3})\times Tz$ down to the nearest whole number, and that the WSP of the particular pixel takes on the tone Tz. Further, when it is specified in the font (RGB data), for a pixel other than the particular pixel, that the R subpixel in the first column takes on a tone TX, that the G subpixel in the second column takes on a tone TY, and that the B subpixel in the third column takes on a tone TZ, it is specified in the RGBW data, as shown in FIG. 8, that $RSP=j\times TX-$(smallest value among the tones TX, TY, and TZ), $GSP=j\times TY-$(smallest value among the tones TX, TY, and TZ), $BSP=j\times TZ-$(smallest value among the tones TX, TY, and TZ), and $WSP=$smallest value among the tones TX, TY, and TZ (where $1\leq j\leq 2$).

Figure 9:
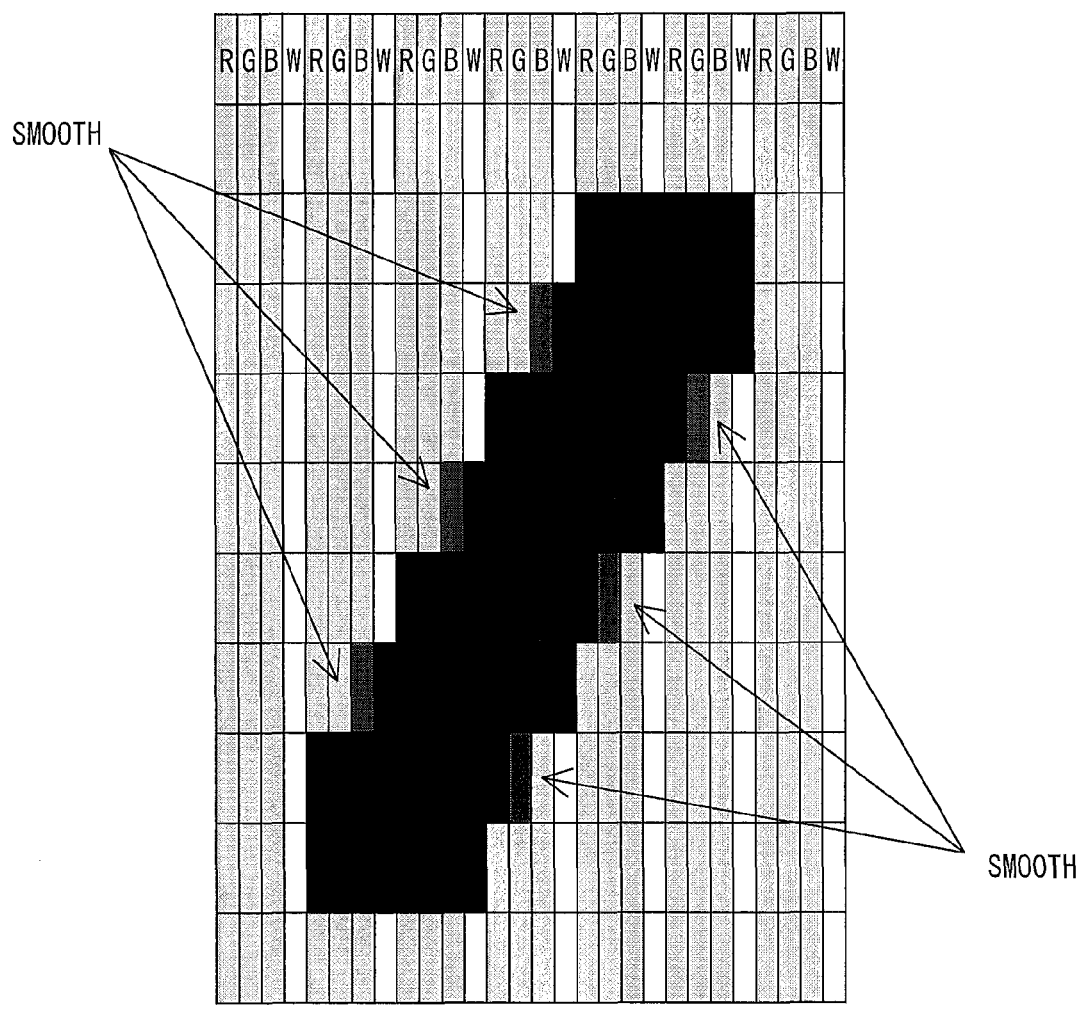
FIG. 9 is a schematic view showing a display state of RGBW data created in the manners shown in FIGS. 7 and 8.

Since, in FIG. 15, it is specified in each of the pixels P1 to P3 that $RSP=255$, $GSP=255$, and $BSP=0$, it is specified in the RGBW data, for each of the pixels P1 to P3, that $RSP=255$, $GSP=255$, $BSP=170$, and $WSP=0$ (see FIG. 9). Further, since, in FIG. 15, it is specified in each of the pixels P4 to P6 that $RSP=0$, $GSP=255$, and $BSP=255$, it is specified in the RGBW data, for each of the pixels P4 to P6, that $RSP=0$, $GSP=170$, $BSP=225$, and $WSP=255$ (see FIG. 9). FIG. 9 shows that a smoother character edge is displayed than in FIG. 21 and an appropriate antialiasing effect is produced.

Figure 10:
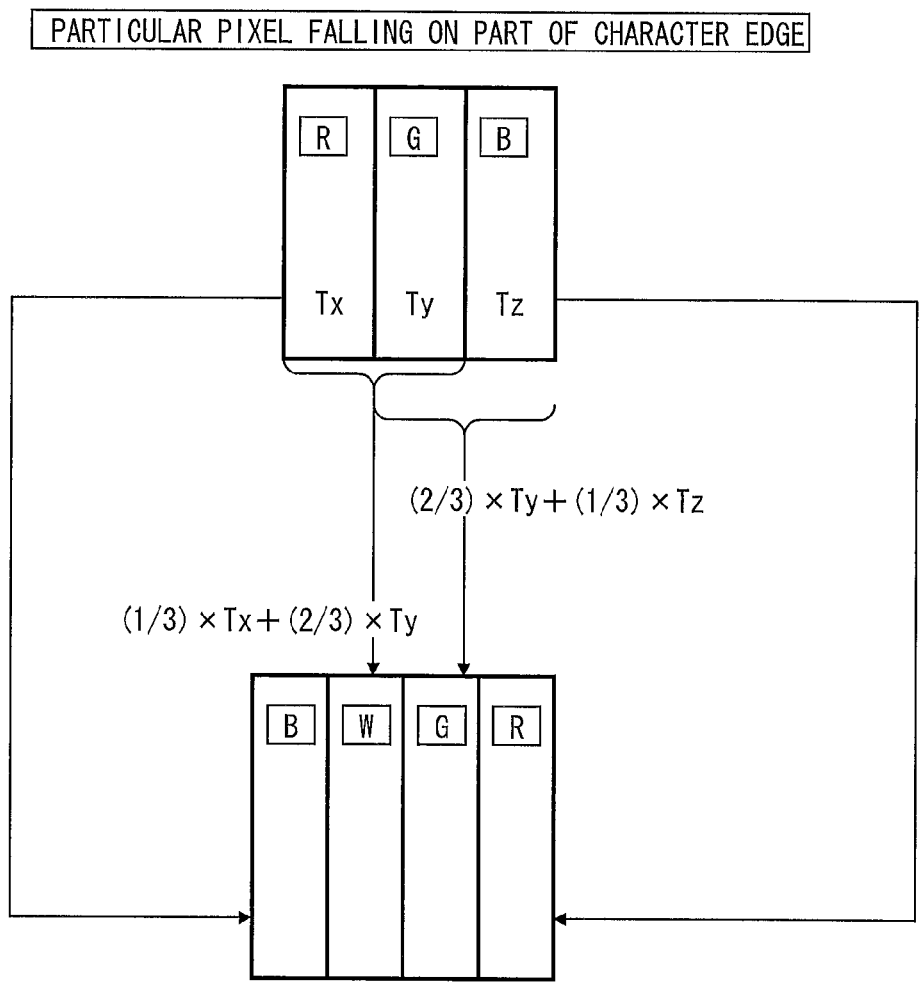
FIG. 10 is an explanatory diagram showing a method for creating RGBW data (for a pixel other than the particular pixel) with a different color arrangement of subpixels.

For example, see a case where each pixel of the liquid crystal panel 5 has a B subpixel (BSP), a W subpixel (BSP), an G subpixel (RSP), and an R subpixel (GSP) placed in the first to fourth rows, respectively. In this case, when it is specified in the font (RGB data), for a particular pixel falling on part of a character edge (such a pixel as the pixels P1 to P6 of FIG. 15, which shows an example of a display of the font on a three-color liquid crystal display device), that the RSP takes on a tone Tx, that the GSP takes on a tone Ty, and that the BSP takes on a tone Tz, it is specified in the RGBW data, as shown in FIG. 10, that the BSP of the particular pixel takes on the tone Tx, that the WSP of the particular pixel takes on a tone which is obtained by rounding $(\frac{1}{3})\times Tx+(\frac{2}{3})\times Ty$ down to the nearest whole number, that the GSP of the particular pixel takes on a tone which is obtained by rounding $(\frac{2}{3})\times Ty+(\frac{1}{3})\times Tz$ down to the nearest whole number, and that the RSP of the particular pixel takes on the tone Tz.

The method for creating RGBW data in a case where the liquid crystal panel 5 has pixels each constituted by four subpixels having four different colors, respectively, arranged in stripes is not limited to that described above.

Figure 11:
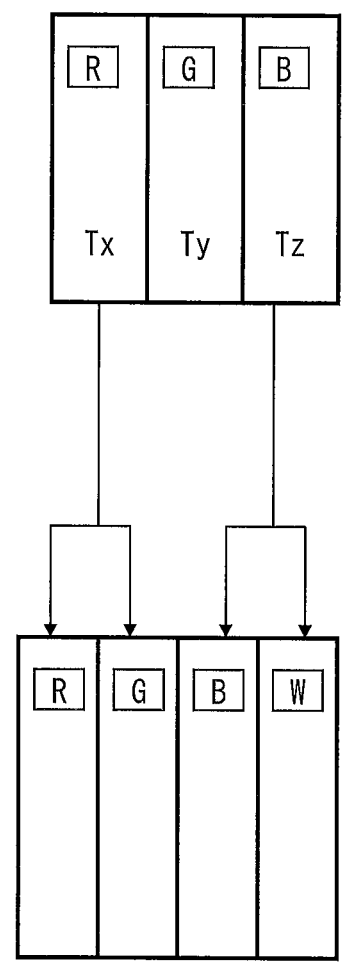
FIG. 11 is an explanatory diagram showing another method for creating RGBW data (for a particular pixel) according to Embodiment 2.

For example, it may be that $KA=KD=KE=KG=0$, $KB=KH=KC=KF=1$, and $\alpha=\beta=\gamma=\delta=1$. See a case where each pixel of the liquid crystal panel 5 has an R subpixel (RSP), a G subpixel (GSP), a B subpixel (BSP), and a W subpixel (WSP) placed in the first to fourth columns, respectively. In this case, when it is specified in the font (RGB data), for a particular pixel falling on part of a character edge (such a pixel as the pixels P1 to P6 of FIG. 15, which shows an example of a display of the font on a three-color liquid crystal display device), that the RSP takes on a tone Tx, that the GSP takes on a tone Ty, and that the BSP takes on a tone Tz, it can also be specified in the RGBW data, as shown in FIG. 11, that the RSP and GSP of the particular pixel each take on the tone Tx and that the BSP and WSP of the particular pixel each take on the tone Tz.

Alternatively, it may also be that $KA=KC=KF=KG=0$, $KB=KD=KE=KH=1$, and $\alpha=\beta=\gamma=\delta=1$. See a case where each pixel of the liquid crystal panel 5 has an R subpixel (RSP), a G subpixel (GSP), a B subpixel (BSP), and a W subpixel (WSP) placed in the first to fourth columns, respectively. In this case, when it is specified in the font (RGB data), for a particular pixel falling on part of a character edge (such a pixel as the pixels P1 to P6 of FIG. 15, which shows an example of a display of the font on a three-color liquid crystal display device), that the RSP takes on a tone Tx, that the GSP takes on a tone Ty, and that the BSP takes on a tone Tz, it can also be specified in the RGBW data, as shown in FIG. 12, that the RSP of the particular pixel takes on the tone Tx, that the GSP and BSP of the particular pixel each take on the tone Ty, and that the WSP of the particular pixel takes on the tone Tz.

A liquid crystal display device according the present invention is a liquid crystal display device including: pixels each composed of first to fourth subpixels having four different colors, respectively, the first to fourth subpixels being arranged in a two-by-two matrix, the first subpixel being placed in the first row and the first column, the second subpixel being placed in the first row and the second column, the third subpixel being placed in the second row and the second column, the fourth subpixel being placed in the second row and the first column, in displaying a font (i) subjected to subpixel rendering premised on a pixel composed of three subpixels having three different colors, respectively, the three subpixels being arranged in three columns of stripe, and (ii) specified, regarding a predetermined pixel falling on part of a character edge, that the subpixel in the first column takes on a tone Tx, that the subpixel in the second column takes on a tone Ty, and that the subpixel in the third column takes on a tone Tz, the liquid crystal display device specifying, regarding the predetermined pixel, that the first subpixel takes on a tone which is obtained by performing rounding on $\alpha \times (Tx \times Kb + Ty \times Ka) = p$, that the second subpixel takes on a tone which is obtained by performing rounding on $\beta \times (Ty \times Kc + Tz \times Kd) = q$, that the third subpixel takes on a tone which is obtained by performing rounding on $\gamma \times (Ty \times Ke + Tz \times Kf) = v$, and that the second subpixel takes on a tone which is obtained by performing rounding on $\delta \times (Tx \times Kh + Ty \times Kg) = u$, where $0 \leq Ka < Kb \leq 1$, $0 \leq Kc < Kd \leq 1$, $0 \leq Ke < Kf \leq 1$, $0 \leq Kg < Kh \leq 1$, and $\alpha$, $\beta$, $\gamma$, and $\delta$ are each a positive number.

The tone of each of the first and fourth subpixels located in the first column in each pixel of a four-color liquid crystal display device (i.e., a liquid crystal display device having pixels each composed of first to fourth subpixels having four different colors, respectively, arranged in a two-by-two matrix) that falls on part of a character edge is determined with a higher degree of contribution of the tone Tx of the subpixel located in the first column in each pixel of a three-color liquid crystal display device, and the tone of each of the second and third subpixels located in the second column in each pixel of the four-color liquid crystal display is determined with a higher degree of contribution of the tone Tz of the subpixel located in the third column in each pixel of the three-color liquid crystal display device. This makes it possible to produce an appropriate antialiasing effect on a font displayed on the four-color liquid crystal display device.

The liquid crystal display device according to the present invention can also be configured such that $Ka/Kb = Kc/Kd = Ke/Kf = Kg/Kh = ½$.

The liquid crystal display device according to the present invention can also be configured such that $Ka = Kc = Ke = Kg = 0$ and $Kb = Kd = Kf = Kh = 1$.

A liquid crystal display device according the present invention is a liquid crystal display device including: pixels each composed of first to fourth subpixels having four different colors, respectively, the first to fourth subpixels being arranged in four columns of stripe, the first subpixel being placed in the first column, the second subpixel being placed in the second column, the third subpixel being placed in the third column, the fourth subpixel being placed in the fourth column, in displaying a font (i) subjected to subpixel rendering premised on a pixel composed of three subpixels having three different colors, respectively, the three subpixels being arranged in three columns of stripe, and (ii) specified, regarding a predetermined pixel falling on part of a character edge, that the subpixel in the first column takes on a tone Tx, that the subpixel in the second column takes on a tone Ty, and that the subpixel in the third column takes on a tone Tz, the liquid crystal display device specifying, regarding the predetermined pixel, that the first subpixel takes on a tone which is obtained by performing rounding on $\alpha \times (Tx \times KB + Ty \times KA) = P$, that the second subpixel takes on a tone which is obtained by performing rounding on $\beta \times (Tx \times KC + Ty \times KD) = Q$, that the third subpixel takes on a tone which is obtained by performing rounding on $\gamma \times (Ty \times KE + Tz \times KF) = V$, and that the fourth subpixel takes on a tone which is obtained by performing rounding on $\delta \times (Ty \times KG + Tz \times KH) = U$, where $0 \leq KA < KB \leq 1$, $0 \leq KC \leq 1$, $0 \leq KD \leq 1$, $0 \leq KE \leq 1$, $0 \leq KF \leq 1$, $0 \leq KG < KH \leq 1$, and $\alpha$, $\beta$, $\gamma$, and $\delta$ are each a positive number.

The tone of the first subpixel located in the first column in each pixel of a four-color liquid crystal display device (i.e., a liquid crystal display device having pixels each composed of first to fourth subpixels having four different colors, respectively. arranged in stripes) that falls on part of a character edge is determined with a higher degree of contribution of the tone Tx of the subpixel located in the first column in each pixel of a three-color liquid crystal display device, and the tone of the fourth subpixels located in the fourth column in each pixel of the four-color liquid crystal display is determined with a higher degree of contribution of the tone Tz of the subpixel located in the third column in each pixel of the three-color liquid crystal display device. This makes it possible to produce an appropriate antialiasing effect on a font displayed on the four-color liquid crystal display device.

The liquid crystal display device according to the present invention can also be configured such that $KA = KG = 0$, $KB = KH = 1$, and $KC/KD = KE/KF = ½$.

The liquid crystal display device according to the present invention can also be configured such that the four colors are red, green, blue, and white, and the three colors are red, green, and blue.

The liquid crystal display device according to the present invention can also be configured such that the font is Clear Type (registered trademark).

The liquid crystal display device according to the present invention can also be configured such that of the three subpixels arranged in three columns of stripe, the subpixel in the first column is of the same color as the first subpixel, the subpixel in the second column is of the same color as the second subpixel, and the subpixel in the third column is of the same color as the third subpixel.

The liquid crystal display device according to the present invention can also be configured such that in displaying a font specified, regarding a pixel not falling on a character edge, that the subpixel in the first column takes on a tone TX, that the subpixel in the second column takes on a tone TY, and that the subpixel in the third column takes on a tone TZ, the liquid crystal display device specifies, for the pixel not falling on a character edge, that the first subpixel takes on a tone which is obtained by performing rounding on $(j \times TX) - TM = X$, that the second subpixel takes on a tone which is obtained by performing rounding on $(j \times TY) - TM = Y$, that the third subpixel takes on a tone which is obtained by performing rounding on $(j \times TZ) - TM = Z$, and that the second subpixel takes on a tone TM, where $1 \leq j \leq 2$ and the tone TM is the smallest tone among the tones TX, TY, and TZ.

The liquid crystal display device according to the present invention can also be configured such that $\alpha = \beta = \gamma = \delta = 1$.

The liquid crystal display device according to the present invention can also be configured such that when the first to fourth subpixels displays identical tones with a luminance ratio of L1:L2:L3:L4, $\alpha = 2 \times L4/(L1+L4)$, $\beta = 2 \times L3/(L2+L3)$, $\gamma = 2 \times L2/(L2+L3)$, and $\delta = 2 \times L1/(L1+L4)$.

The liquid crystal display device according to the present invention can also be configured such that the first to fourth subpixels are red, green, blue, and white, respectively.

The liquid crystal display device according to the present invention can also be configured such that the rounding is rounding down to a predetermined decimal place or rounding off a predetermined decimal place.

A method for displaying a font on a liquid crystal display device according to the present invention is a method for displaying a font on a liquid crystal display device including pixels each composed of first to fourth subpixels having four different colors, respectively, the first to fourth subpixels being arranged in a two-by-two matrix, the first subpixel being placed in the first row and the first column, the second subpixel being placed in the first row and the second column, the third subpixel being placed in the second row and the second column, the fourth subpixel being placed in the second row and the first column, the method including the step of, in displaying a font (i) subjected to subpixel rendering premised on a pixel composed of three subpixels having three different colors, respectively, the three subpixels being arranged in three columns of stripe, and (ii) specified, regarding a predetermined pixel falling on part of a character edge, that the subpixel in the first column takes on a tone Tx, that the subpixel in the second column takes on a tone Ty, and that the subpixel in the third column takes on a tone Tz, specifying, regarding the predetermined pixel, that the first subpixel takes on a tone which is obtained by performing rounding on $\alpha \times (Tx \times Kb + Ty \times Ka) = p$, that the second subpixel takes on a tone which is obtained by performing rounding on $\beta \times (Ty \times Kc + Tz \times Kd) = q$, that the third subpixel takes on a tone which is obtained by performing rounding on $\gamma \times (Ty \times Ke + Tz \times Kf) = v$, and that the fourth subpixel takes on a tone which is obtained by performing rounding on $\delta \times (Tx \times Kh + Ty \times Kg) = u$, where $0 \leq Ka < Kb \leq 1$, $0 \leq Kc < Kd \leq 1$, $0 \leq Ke < Kf \leq 1$, $0 \leq Kg < Kh \leq 1$, and $\alpha$, $\beta$, $\gamma$, and $\delta$ are each a positive number.

A method for displaying a font on a liquid crystal display device according to the present invention is a method for displaying a font on a liquid crystal display device including pixels each composed of first to fourth subpixels having four different colors, respectively, the first to fourth subpixels being arranged in four columns of stripe, the first subpixel being placed in the first column, the second subpixel being placed in the second column, the third subpixel being placed in the third column, the fourth subpixel being placed in the fourth column, the method including the step of, in displaying a font (i) subjected to subpixel rendering premised on a pixel composed of three subpixels having three different colors, respectively, the three subpixels being arranged in three columns of stripe, and (ii) specified, regarding a predetermined pixel falling on part of a character edge, that the subpixel in the first column takes on a tone Tx, that the subpixel in the second column takes on a tone Ty, and that the subpixel in the third column takes on a tone Tz, specifying, regarding the predetermined pixel, that the first subpixel takes on a tone which is obtained by performing rounding on $\alpha \times (Tx \times KB + Ty \times KA) = P$, that the second subpixel takes on a tone which is obtained by performing rounding on $\beta \times (Tx \times KC + Ty \times KD) = Q$, that the third subpixel takes on a tone which is obtained by performing rounding on $\gamma \times (Ty \times KE + Tz \times KF) = V$, and that the fourth subpixel takes on a tone which is obtained by performing rounding on $\delta \times (Ty \times KG + Tz \times KH) = U$, where $0 \leq KA < KB \leq 1$, $0 \leq KC \leq 1$, $0 \leq KD \leq 1$, $0 \leq KE \leq 1$, $0 \leq KF \leq 1$, $0 \leq KG < KH \leq 1$, and $\alpha$, $\beta$, $\gamma$, and $\delta$ are each a positive number.

The present invention is not limited to the description of the embodiments above. An embodiment based on a proper alteration of the embodiment or on a proper combination of the embodiments is encompassed in the embodiments of the present invention.

INDUSTRIAL APPLICABILITY

A liquid crystal display device is suitably applicable, for example, to electronic books, cellular phones, laptop PCs, etc.

REFERENCE SIGNS LIST

Tx to Tz Tone of RGB data
TX to TZ Tone of RGB data
P1 to P6 Particular pixel
1 Liquid crystal display device
2 Display control circuit
5 Liquid crystal panel
6 Data conversion circuit

The invention claimed is:

1. A liquid crystal display device comprising:
pixels each including first to fourth subpixels having four different colors, respectively, the first to fourth subpixels being arranged in a two-by-two matrix, the first subpixel being placed in the first row and the first column, the second subpixel being placed in the first row and the second column, the third subpixel being placed in the second row and the second column, the fourth subpixel being placed in the second row and the first column,
in displaying a font (i) subjected to subpixel rendering premised on a pixel composed of three subpixels having three different colors, respectively, the three subpixels being arranged in three columns of stripes, and (ii) specified, regarding a predetermined pixel falling on a portion of a character edge, that the subpixel in the first column of stripes takes on a tone Tx, that the subpixel in the second column of stripes takes on a tone Ty, and that the subpixel in the third column of stripes takes on a tone Tz,
said liquid crystal display device specifying, regarding the predetermined pixel, that the first subpixel takes on a tone which is obtained by rounding off a first value which is equal to $\alpha \times (Tx \times 2/3 + Ty \times 1/3)$, that the second subpixel takes on a tone which is obtained by rounding off a second value which is equal to $\beta \times (Ty \times 1/3 + Tz \times 2/3)$, that the third subpixel takes on a tone which is obtained by rounding off a third value which is equal to $\gamma \times (Ty \times 1/3 + Tz \times 2/3)$, and that the fourth subpixel takes on a tone which is obtained by rounding off a fourth value which is equal to $\delta \times (Tx \times 2/3 + Ty \times 1/3)$,
the first to fourth subpixels displaying identical tones with a luminance ratio of L1:L2:L3:L4, where L1 is the luminance of the first subpixel, L2 is the luminance of the second subpixel, L3 is the luminance of the third subpixel, and L4 is the luminance of the fourth subpixel, and $\alpha = 2 \times L4/(L1+L4)$, $\beta = 2 \times L3/(L2+L3)$, $\gamma = 2 \times L2/(L2+L3)$, and $\delta = 2 \times L1/(L1+L4)$.

2. A liquid crystal display device comprising:
pixels each including first to fourth subpixels having four different colors, respectively, the first to fourth subpixels being arranged in four columns of stripes, the first subpixel being placed in the first column of stripes, the second subpixel being placed in the second column of stripes, the third subpixel being placed in the third column of stripes, the fourth subpixel being placed in the fourth column of stripes,
in displaying a font (i) subjected to subpixel rendering premised on a pixel composed of three subpixels having three different colors, respectively, the three subpixels being arranged in three columns of stripes, and (ii) specified, regarding a predetermined pixel falling on a portion of a character edge, that the subpixel in the first column of stripes takes on a tone Tx, that the subpixel in the second column of stripes takes on a tone Ty, and that the subpixel in the third column of stripes takes on a tone Tz, said liquid crystal display device specifying, regarding the predetermined pixel, that the first subpixel takes on a tone which is a first value equal to Tx, that the second subpixel takes on a tone which is obtained by rounding off a second value which is equal to $Tx \times 1/3 + Ty \times 2/3$, that the third subpixel takes on a tone which is obtained by rounding off a third value which is equal to $Ty \times 2/3 + Tz \times 1/3$, and that the fourth subpixel takes on a tone which is a fourth value equal to Tz.

3. The liquid crystal display device as set forth in claim 2, wherein the four colors are red, green, blue, and white, and the three colors are red, green, and blue.

4. The liquid crystal display device as set forth in claim 3, wherein the first to fourth subpixels are red, green, blue, and white, respectively.

5. The liquid crystal display device as set forth in claim 2, wherein the font is a subpixel rendered font.

6. The liquid crystal display device as set forth in claim 2, wherein of the three subpixels arranged in three columns of stripes, the subpixel in the first column of stripes is the same color as the first subpixel, the subpixel in the second column of stripes is the same color as the second subpixel, and the subpixel in the third column of stripes is the same color as the third subpixel.

7. The liquid crystal display device as set forth in claim 6, wherein in displaying a font specified, regarding a pixel not falling on a character edge, that the subpixel in the first column takes on a tone TX, that the subpixel in the second column takes on a tone TY, and that the subpixel in the third column takes on a tone TZ, the liquid crystal display device specifies, regarding the pixel not falling on a character edge, that the first subpixel takes on a tone which is obtained by rounding off a fifth value which is equal to $(j \times TX) - TM$, that the second subpixel takes on a tone which is obtained by rounding off a sixth value which is equal to $(j \times TY) - TM$, that the third subpixel takes on a tone which is obtained by rounding off a seventh value which is equal to $(j \times TZ) - TM$, and that the fourth subpixel takes on a tone TM, where j is a positive number, $1 \leq j \leq 2$, and the tone TM is equal to the smallest tone among the tones TX, TY, and TZ.

8. The liquid crystal display device as set forth in claim 2, wherein the rounding off is rounding down to a predetermined decimal place or rounding off of a predetermined decimal place.

9. A method for displaying a font on a liquid crystal display device including pixels each including first to fourth subpixels having four different colors, respectively, the first to fourth subpixels being arranged in four columns of stripes, the first subpixel being placed in the first column of stripes, the second subpixel being placed in the second column of stripes, the third subpixel being placed in the third column of stripes, the fourth subpixel being placed in the fourth column of stripes, the method comprising the step of, in displaying a font (i) subjected to subpixel rendering premised on a pixel composed of three subpixels having three different colors, respectively, the three subpixels being arranged in three columns of stripes, and (ii) specified, regarding a predetermined pixel falling on a portion of a character edge, that the subpixel in the first column of stripes takes on a tone Tx, that the subpixel in the second column of stripes takes on a tone Ty, and that the subpixel in the third column of stripes takes on a tone Tz, specifying, regarding the predetermined pixel, that the first subpixel takes on a tone which is a first value equal to Tx, that the second subpixel takes on a tone which is obtained by rounding off a first value which is equal to $Tx \times 1/3 + Ty \times 2/3$, that the third subpixel takes on a tone which is obtained by rounding off a third value which is equal to $Ty \times 2/3 + Tz \times 1/3$, and that the fourth subpixel takes on a tone which is a fourth value equal to Tz.

* * * * *